United States Patent
Mohn et al.

(10) Patent No.: US 7,092,502 B2
(45) Date of Patent: Aug. 15, 2006

(54) SYSTEM AND METHOD FOR REPORTING AND DELIVERING CALLS

(75) Inventors: Gregory H. Mohn, Eden Prairie, MN (US); Michael J. Anderson, Minnetonka, MN (US); Andrew Armstrong, Minneapolis, MN (US)

(73) Assignee: CallVision, Inc., Seattle, WA (US)

( * ) Notice: Subject to any disclaimer, the term of this patent is extended or adjusted under 35 U.S.C. 154(b) by 800 days.

(21) Appl. No.: 09/842,578

(22) Filed: Apr. 26, 2001

(65) Prior Publication Data

US 2002/0031210 A1    Mar. 14, 2002

Related U.S. Application Data

(63) Continuation-in-part of application No. 09/441,822, filed on Nov. 17, 1999.

(60) Provisional application No. 60/108,731, filed on Nov. 17, 1998.

(51) Int. Cl.
    *H04M 3/42* (2006.01)
    *H04M 15/00* (2006.01)
(52) U.S. Cl. .................. 379/201.01; 379/133
(58) Field of Classification Search ................ 379/133, 379/32.01, 201.01; 370/360
    See application file for complete search history.

(56) References Cited

U.S. PATENT DOCUMENTS

| | | | |
|---|---|---|---|
| 4,853,852 A | 8/1989 | Rosen | |
| 5,101,425 A | 3/1992 | Darland et al. | |
| 5,237,157 A | 8/1993 | Kaplan | |
| 5,425,087 A | 6/1995 | Gerber et al. | |
| 5,504,810 A | 4/1996 | McNair | |
| 5,606,600 A | 2/1997 | Elliot et al. | |
| 5,623,590 A | 4/1997 | Becker et al. | |
| 5,754,634 A | 5/1998 | Kay et al. | |
| 5,825,769 A * | 10/1998 | O'Reilly et al. | 370/360 |
| 5,901,214 A | 5/1999 | Shaffer et al. | |
| 5,930,344 A * | 7/1999 | Relyea et al. | 379/126 |
| 5,999,604 A | 12/1999 | Walter | |
| 6,134,307 A | 10/2000 | Brouckman et al. | |
| 6,385,301 B1 * | 5/2002 | Nolting et al. | 379/32.01 |
| 6,744,866 B1 * | 6/2004 | Nolting et al. | 379/133 |

\* cited by examiner

*Primary Examiner*—Wing Chan
*Assistant Examiner*—Thjuan P. Knowlin
(74) *Attorney, Agent, or Firm*—Kenyon & Kenyon LLP

(57) ABSTRACT

A method and apparatus for arranging, reporting, and delivering call record information to customers. The communication records of each customer includes call transaction data corresponding to call transaction activity of the customer. The call transaction data is received and matched to a customer. The call transaction data is appropriately formatted, and electronically transmitting the formatted call transaction data to the subscriber, such as via e-mail.

46 Claims, 23 Drawing Sheets

| BBOC ID | Vencode | Cmr_rate | study type | vendor type | btn | line | time | date |
|---|---|---|---|---|---|---|---|---|
| 85006cf5c010 | 11 | cmr_sample_c | 0 | 0 | 10507288180 | 10507252750 | 06050700 | 819981007 |

44 — 46 — 48 — 50 — 52

| calling party | name | zip | calltype | response type | duration | sec | err code | busyed | exception | busycause |
|---|---|---|---|---|---|---|---|---|---|---|
| 10507867918 | nr | 9559233503 | CONTINUE | 1 | 1 | 40 | 0 | 0 | 0 | |

| File_ID | CDATE | CTIME | DN | CPN | CALL_TYPE | CALL_DISP | CALL_STAT | CALL_DUR | XACTION | CPN_NAME | POSTALCODE | LONGITUDE | LATITUDE | Q_BYTES | MISC |
|---|---|---|---|---|---|---|---|---|---|---|---|---|---|---|---|
| | 8/22/98 | 04:18:15 PM | 5135551212 | 9375787400 | I | 2 | 0 | 0 | | unavailable | | -84.193714 | 39.759868 | S | |
| | 8/22/98 | 04:18:36 PM | 5135551212 | 8122562495 | I | 0 | 1 | 260 | | unavailable | | -85.384117 | 38.733633 | S | |
| | 8/22/98 | 04:32:30 PM | 5135551212 | 7405458420 | I | 0 | 1 | 200 | | unavailable | | -82.961757 | 40.232652 | S | |
| | 8/22/98 | 06:39:51 PM | 5135551212 | 1111111111 | I | 0 | 1 | 360 | | unavailable | | 0.000000 | 0.000000 | U | |
| | 8/23/98 | 08:55:34 AM | 5135551212 | 5555555555 | O | 0 | 1 | 2730 | | unavailable | | 0.000000 | 0.000000 | U | |
| | 8/23/98 | 09:09:07 AM | 5135551212 | 1111111111 | I | 0 | 0 | 240 | | unavailable | | 0.000000 | 0.000000 | U | |
| | 8/23/98 | 09:52:46 AM | 5135551212 | 1111111111 | I | 1 | 0 | 0 | | unavailable | | 0.000000 | 0.000000 | U | |
| | 8/23/98 | 12:22:41 PM | 5135551212 | 1111111111 | I | 0 | 1 | 230 | | unavailable | | 0.000000 | 0.000000 | U | |
| | 8/23/98 | 12:46:28 PM | 5135551212 | 5133901888 | I | 0 | 1 | 110 | | unavailable | | -84.519930 | 39.102459 | S | |
| | 8/23/98 | 01:41:09 PM | 5135551212 | 6066207160 | I | 0 | 1 | 220 | | unavailable | | -84.519930 | 39.102459 | S | |
| | 8/23/98 | 01:53:10 PM | 5135551212 | 9378565488 | I | 0 | 1 | 100 | | unavailable | | -84.364952 | 39.623529 | S | |
| | 8/23/98 | 02:17:51 PM | 5135551212 | 1111111111 | I | 0 | 0 | 0 | | unavailable | | 0.000000 | 0.000000 | U | |
| | 8/23/98 | 03:32:58 PM | 5135551212 | 1111111111 | I | 0 | 1 | 50 | | unavailable | | 0.000000 | 0.000000 | U | |
| | 8/23/98 | 03:47:34 PM | 5135551212 | 5136598931 | I | 3 | 0 | 0 | | unavailable | | -84.519930 | 39.102459 | S | |
| | 8/23/98 | 05:30:56 PM | 5135551212 | 7658471638 | I | 0 | 1 | 220 | | unavailable | | -84.941571 | 40.049073 | S | |
| | 8/23/98 | 07:16:25 PM | 5135551212 | 9372740967 | I | 0 | 1 | 70 | | unavailable | | -84.225906 | 39.790287 | S | |
| | 8/23/98 | 11:09:44 PM | 5135551212 | 1111111111 | I | 0 | 1 | 2720 | | unavailable | | 0.000000 | 0.000000 | U | |
| | 8/21/98 | 09:06:43 AM | 5135551212 | 6066354067 | O | 0 | 1 | 50 | | unavailable | 410019720 | -84.419803 | 38.880692 | A | |
| | 8/20/98 | 09:17:34 AM | 5135551212 | 6065895650 | I | 0 | 1 | 4400 | | unavailable | 410058211 | -84.722085 | 39.028344 | A | |
| | 8/19/98 | 08:33:35 AM | 5135551212 | 6086697769 | I | 2 | 0 | 0 | | unavailable | 410059751 | -84.737297 | 39.075182 | A | |
| | 8/19/98 | 09:05:04 AM | 5135551212 | 6066879769 | I | 0 | 1 | 2180 | | unavailable | 410059751 | -84.737297 | 39.075182 | A | |
| | 8/19/98 | 05:22:59 PM | 5135551212 | 6066896779 | I | 0 | 1 | 2850 | | unavailable | 410059751 | -84.737297 | 39.075182 | A | |
| | 8/21/98 | 08:55:45 PM | 5135551212 | 6066722444 | I | 0 | 1 | 280 | | unavailable | 410069608 | -84.369442 | 38.787168 | A | |
| | 8/17/98 | 11:59:37 AM | 5135551212 | 6069218116 | O | 1 | 1 | 760 | | unavailable | 410111135 | -84.530487 | 39.082738 | A | |
| | 8/20/98 | 02:43:02 PM | 5135551212 | 6062198116 | I | 0 | 1 | 3450 | | unavailable | 410111135 | -84.530487 | 39.082738 | A | |
| | 8/21/98 | 04:59:46 PM | 5135551212 | 6062916544 | I | 0 | 0 | 0 | | unavailable | 410111160 | -84.529001 | 39.082483 | A | |
| | 8/18/98 | 10:21:30 AM | 5135551212 | 6062198116 | I | 1 | 1 | 1610 | | unavailable | 410111160 | -84.529001 | 39.082483 | A | |
| | 8/19/98 | 09:26:36 AM | 5135551212 | 6069214564 | I | 0 | 1 | 710 | | unavailable | 410111160 | -84.529001 | 39.082483 | A | |

Fig. 8

Geocoding logic hierarchy

| Criterion | | Value |
|---|---|---|
| IF 180—CASE 1 | | |
| 9 digit zip exists in zip field | & exists in -> 9 digit zip DB | A |
| otherwise | exists in -> 5 digit zip DB | B |
| otherwise | exists in -> 3 digit zip DB | C |
| otherwise | npanxx of calling # field exists in -> npanxx DB | D |
| otherwise | npa of calling # field exists in -> nap DB | E |
| otherwise | use special value indicating unknown origin | F |
| otherwise, IF 182—CASE 2 | | |
| 6,7,or 8 digit zip exists in zip field (bad data) AND | | |
| | npanxx of calling # field exists in -> npanxx DB | G |
| otherwise | npa of calling # field exists in -> nap DB | H |
| otherwise | use special value indicating unknown origin | I |
| otherwise, IF 184—CASE 3 | | |
| 5 digit zip exists in zip field | & exists in -> 5 digit zip DB | J |
| otherwise | exists in -> 3 digit zip DB | K |
| otherwise | npanxx of calling # field exists in -> npanxx DB | L |
| otherwise | npa of calling # field exists in -> nap DB | M |
| otherwise | use special value indicating unknown origin | N |
| otherwise, IF 186—CASE 4 | | |
| < 5 digit zip exists in zip field (bad data) AND | | |
| | npanxx of calling # field exists in -> npanxx DB | P |
| otherwise | npa of calling # field exists in -> nap DB | Q |
| otherwise | use special value indicating unknown origin | R |
| otherwise, IF 188—CASE 5 | | |
| 0 or null exists in zip field (no zip) AND | | |
| | npanxx of calling # field exists in -> npanxx DB | S |
| otherwise | npa of calling # field exists in -> nap DB | T |
| otherwise | use special value indicating unknown origin | U |

Fig. 9

From: TeleFlash @xyztelco.com — 252
Sent: Monday, April 10, 2000 8:00 — 254
To: customer@ispserver.com
Subject: Telco Weekly Call Summary

250

Telephone Co. *TeleFlash*
258

256

| Here is your call summary information for the week of: | April 3, 2000 – April 9, 2000 |

Phone Number: 301-555-1234

| Total incoming calls for the week: | 2909 | |
| Total answered calls for the week: | 2744 | (94%) |
| Total unanswered calls for the week: | 30 | (1%) |
| Total busy calls for the week: | 134 | (5%) |
| Total other calls for the week: | 1 | (0%) |
| Your 7 day average calls per day: | 416 | |
| Your Mon-Fri average calls per day: | 562 | |
| Your busiest calling day: | Thursday | |
| Your busiest calling hour: | 3-4 PM | |

260

262

Try Call Option-1 for as low as $25.00 a month

You will be able to analyze:
- Maps of calls and callers
- Lists of top callers and callers who received busies
- Who you spend the most amount of time with?
- Trends of what happens by week, month, etc...
- How effective your marketing and advertising programs are?

http://www.xyztelco.com
266

Advertisement Text... Advertisement Text... Advertisement Text... Advertisement Text...

264

270

If you would like to have this E-mail sent to other individuals within your company, go to http://www.xyztelco/teleflash.com/personalpage If you would like to stop receiving this E-mail notification, go to http://www.xyztelco/teleflash.com/personalpage — 268

| 344 | 346 | 348 | 350 | 352 | 354 |
|---|---|---|---|---|---|
| VARIABLE ID | VARIABLE NAME | VARIABLE OBJECT | VARIABLE ROW | VARIABLE COLUMN | ETC. |

342 — VARIABLE A

340

VARIABLE n

Fig. 17

| | Variable Name | Description |
|---|---|---|
| 360 | INCOMING | NUMBER OF CALLS THAT CAME IN |
| 362 | ANSWERED | NUMBER OF CALLS THAT WERE ANSWERED |
| 364 | UNANSWERED | NUMBER OF CALLS THAT WERE UNANSWERED |
| 366 | BUSY | NUMBER OF CALLS THAT WERE BUSY |
| 368 | OTHER | NUMBER OF CALLS THAT WERE OF AN UNKNOWN STATE |
| 370 | INCOMING % | PERCENTAGE OF CALLS THAT CAME IN (i.e., 100%) |
| 372 | ANSWERED % | PERCENTAGE OF CALLS THAT WERE ANSWERED |
| 374 | UNANSWERED % | PERCENTAGE OF CALLS THAT WERE UNANSWERED |
| 376 | BUSY % | PERCENTAGE OF CALLS THAT WERE BUSY |
| 378 | OTHER % | PERCENTAGE OF CALLS THAT WERE OF AN UNKNOWN STATE |
| 380 | SEVEN DAY AVERAGE | AVERAGE NUMBER OF CALLS FOR THE SEVEN DAYS |
| 382 | FIVE DAY AVERAGE | AVERAGE NUMBER OF CALLS FOR FIVE DAYS (M-F) |
| 384 | FIVE DAY TOTAL | NUMBER OF CALLS FOR FIVE DAYS (M-F) |
| 386 | BUSY DAY | THE DAY WITH THE MOST TOTAL CALLS |
| 388 | BUSY DAY TOTAL | NUMBER OF CALLS THAT OCCURRED FOR THE BUSIEST DAY |
| 390 | TOP ZIP | THE ZIP CODE WHERE THE MOST CALLS CAME FROM |
| 392 | TOP STATE | THE STATE WHERE THE MOST CALLS CAME FROM |

|  | | | August 1998 ⬋520 | | | |
|---|---|---|---|---|---|---|
| Mon | Tue | Wed | Thu | Fri | Sat | Sun |
| 27 | 28 | 29 | 30 | 31 | 1 | 2 |
| 3 | 4 | 5 | 6 | 7 | 8 | 9 |
| ~~10~~ | ~~11~~ | ~~12~~ | *ACTIVE* ~~13~~ Available | ~~14~~ | ~~15~~ | ~~16~~ |
| ~~17~~ | ~~18~~ | ~~19~~ | ~~20~~ Available | ~~21~~ | ~~22~~ | ~~23~~ |
| 24 | 25 | 26 | 27 | 28 | 29 | 30 |
| 31 | 1 | 2 | 3 | 4 | 5 | 6 |

Fig. 21

New ZIP Codes                    October 26, 1998 - November 1, 1998
                                                                540

New ZIP codes discovered in the current date range ranked by answered call count.

| Zip Code | State | Call Count | First Call Date & Time | Last Call Date & Time | Total Duration |
|---|---|---|---|---|---|
| 55402 | MN | 11 | 10/26/98 11:07:00 AM | 10/30/98 02:46:00 PM | 0:27:40.0 |
| 55416 | MN | 11 | 10/26/98 12:11:00 PM | 10/29/98 02:37:00 PM | 0:11:25.0 |
| 84111 | UT | 6 | 10/26/98 09:56:00 AM | 10/28/98 02:15:00 PM | 0:31:12.0 |
| 55343 | MN | 6 | 10/26/98 01:38:00 PM | 10/30/98 11:57:00 AM | 0:14:28.0 |
| 56304 | MN | 5 | 10/26/98 06:43:00 PM | 10/28/98 05:47:00 PM | 0:44:51.0 |
| 85012 | AZ | 4 | 10/27/98 05:15:00 PM | 10/29/98 05:48:00 PM | 0:06:14.0 |
| 55347 | MN | 4 | 10/26/98 06:51:00 AM | 10/28/98 02:43:00 PM | 0:02:31.0 |
| 98191 | WA | 3 | 10/26/98 10:34:00 AM | 10/29/98 06:09:00 PM | 0:16:07.0 |
| 55104 | MN | 3 | 10/26/98 11:48:00 AM | 10/27/98 11:30:00 AM | 0:03:12.0 |
| 55415 | MN | 3 | 10/27/98 05:34:00 PM | 10/30/98 01:03:00 PM | 0:02:17.0 |
| 80132 | CO | 3 | 10/26/98 12:57:00 PM | 10/26/98 02:57:00 PM | 0:01:24.0 |
| 55425 | MN | 2 | 10/26/98 04:25:00 PM | 10/28/98 03:56:00 PM | 0:06:05.0 |
| 98188 | WA | 2 | 10/28/98 01:26:00 PM | 10/28/98 01:29:00 PM | 0:05:34.0 |
| 83204 | ID | 2 | 10/30/98 11:09:00 AM | 10/30/98 11:09:00 AM | 0:04:48.0 |
| 55431 | MN | 2 | 10/26/98 03:59:00 PM | 10/30/98 09:44:00 AM | 0:03:39.0 |
| 55124 | MN | 2 | 10/27/98 02:08:00 PM | 10/27/98 02:10:00 PM | 0:03:07.0 |
| 55364 | MN | 2 | 10/27/98 03:50:00 PM | 10/27/98 03:50:00 PM | 0:00:46.0 |
| 55437 | MN | 2 | 10/28/98 05:11:00 PM | 10/29/98 03:25:00 PM | 0:00:29.0 |
| 55305 | MN | 1 | 10/27/98 03:20:00 PM | 10/27/98 03:20:00 PM | 0:09:54.0 |
| 85283 | AZ | 1 | 10/28/98 05:44:00 PM | 10/28/98 05:44:00 PM | 0:07:33.0 |
| 85024 | AZ | 1 | 10/27/98 05:41:00 PM | 10/27/98 05:41:00 PM | 0:04:06.0 |
| 80202 | CO | 1 | 10/30/98 01:36:00 PM | 10/30/98 01:36:00 PM | 0:03:35.0 |
| 55118 | MN | 1 | 10/30/98 08:37:00 AM | 10/30/98 08:37:00 AM | 0:03:17.0 |
| 97401 | OH | 1 | 10/29/98 02:13:00 PM | 10/29/98 02:13:00 PM | 0:02:32.0 |
| 80206 | CO | 1 | 10/28/98 10:09:00 AM | 10/28/98 10:09:00 AM | 0:02:02.0 |
| 68144 | NE | 1 | 10/28/98 03:14:00 PM | 10/28/98 03:14:00 PM | 0:01:51.0 |
| 55391 | MN | 1 | 10/28/98 05:36:00 PM | 10/28/98 05:36:00 PM | 0:01:48.0 |
| 55011 | MN | 1 | 10/26/98 02:30:00 PM | 10/26/98 02:30:00 PM | 0:01:47.0 |
| 85255 | AZ | 1 | 10/27/98 05:55:00 PM | 10/27/98 05:55:00 PM | 0:01:22.0 |
| 99216 | WA | 1 | 10/30/98 11:29:00 AM | 10/30/98 11:29:00 AM | 0:01:11.0 |
| 97204 | OR | 1 | 10/26/98 02:08:00 PM | 10/26/98 02:08:00 PM | 0:00:57.0 |
| 55113 | MN | 1 | 10/26/98 03:59:00 PM | 10/26/98 03:59:00 PM | 0:00:43.0 |
| 68102 | NE | 1 | 10/26/98 12:05:00 PM | 10/26/98 12:05:00 PM | 0:00:41.0 |
| 98004 | WA | 1 | 10/30/98 03:32:00 PM | 10/30/98 03:32:00 PM | 0:00:41.0 |
| 55422 | MN | 1 | 10/26/98 11:12:00 AM | 10/26/98 11:12:00 AM | 0:00:20.0 |
| 55102 | MN | 1 | 10/27/98 11:47:00 AM | 10/27/98 11:47:00 AM | 0:00:07.0 |
| 55427 | MN | 1 | 10/26/98 04:09:00 PM | 10/26/98 04:09:00 PM | 0:00:06.0 |
| 55404 | MN | 1 | 10/26/98 04:26:00 PM | 10/26/98 04:26:00 PM | 0:00:05.0 |
| 55420 | MN | 1 | 10/26/98 10:05:00 AM | 10/26/98 10:05:00 AM | 0:00:03.0 |

Fig. 23

SYSTEM AND METHOD FOR REPORTING AND DELIVERING CALLS

RELATED APPLICATIONS

This application is a continuation-in-part of U.S. application Ser. No. 09/441,822, filed Nov. 17, 1999, which claims the benefit of U.S. Provisional Application No. 60/108,731, filed Nov. 17, 1998, both of which are hereby incorporated herein by reference in their entireties.

FIELD OF THE INVENTION

This invention relates in general to call record reporting, and more particularly to a system and method for arranging, reporting, and delivering call record information to customers.

BACKGROUND OF THE INVENTION

Current telecommunications networks are capable of tracking and recording call transaction data, i.e., information associated with a given telephone call, and using this data to support call processing and to provide accurate billing information to customers. Systems have also been developed which strive to provide the customer with quite detailed call transaction data which the customer may use for specific purposes. U.S. Pat. No. 5,425,087 to Gerber, for example, discloses a system that reports the length of each call, the length of time that a party was placed on hold, and the telephone number of the other party to a system administrator so that the telephone activities of employees can be monitored in real time.

U.S. Pat. No. 5,754,634 to Kay, et al. discloses a system for tracking calls made to individual predetermined subscribers and automatically reporting information, including demographic breakdowns of calls, such as time of day, day of week, and location of origin, to the subscriber. The disclosed system makes use of the Advanced Intelligent Network (AIN) and Integrated Service Control Point (ISCP) platform to provide such information to those subscribers desirous of such service. The ISCP captures the time and date of the call, the originating call number and the subscriber's call number. ISCP network data is collected for all calls placed to service subscribers by the AIN Data and Reports System (DRS). DRS is an operation support utility that provides service analysis on the collected data. The data may be sorted on the basis of called subscriber number and transmitted at periodic intervals to a report processor.

The call originating telephone number for each call may be used to access an existing telephone system billing database to obtain caller information, including zip code. The zip code, in turn, can be used to access a commercially available census database to provide further demographic information. For example, demographics for a given zip code may include median age and median income. Report statistics can match these demographics with a number of calls received as collected at the ISCP.

The calling party number may be supplied through Caller ID or AIN transmission. If this information is available only for calls within a telephone company Local Access and Transport Area (LATA), reports may include detailed breakdown of such calls while categorizing out of LATA calls in more general breakdowns. Detailed zip code results can include number and percentage of residential calls, business calls, homeowners, median income and age. Generalized information may include numbers, averages and percentages of calls in time ranges for days of the week.

The existing arrangements have some drawbacks. In the existing arrangements, a zip code cannot be attached to certain calls. For example, because a telephone company has no billing records for telephone numbers outside of its LATA, it cannot attach a zip code to long distance calls. Further, under the existing arrangement, there is no way to attach a geographical indicator to a call without a zip code. Thus, for many calls, no geographical indicator can be attached. Furthermore, even for calls for which a zip code is attached, there is no indication of an actual geographic location. All the subscriber receives is a zip code. Another drawback of the existing arrangements is that the report that is output to the subscriber is only available in tabular form, which tends to be rather cryptic. Thus, it is difficult and inconvenient for the subscriber to comprehend and absorb the information contained in the tables. Further still, the prior art does not facilitate convenient call record report delivery.

There is a need in the telecommunications industry for a system and method of providing accurate call records, and providing such records to service subscribers in a convenient manner. The present invention fulfills these and other needs, and provides additional advantages over the prior art.

SUMMARY OF THE INVENTION

To overcome limitations in the prior art described above, and to overcome other limitations that will become apparent upon reading and understanding the present specification, the present invention generally discloses a system, apparatus and method for arranging, reporting, and delivering call record information to customers.

In accordance with one embodiment of the invention, a method is provided for reporting communication records to at least one subscriber. The communication records of each subscriber includes call transaction data corresponding to call transaction activity of the subscriber. The method includes receiving the call transaction data, and matching the call transaction data associated with the subscriber. The call transaction data is appropriately formatted, and electronically transmitting the formatted call transaction data to the subscriber. One exemplary manner of electronically transmitting the formatted call transaction data is via electronic mail (e-mail). In accordance with other aspects of the invention, a call reporting apparatus, and a computer-readable medium having instructions for carrying out these functions are also provided.

In accordance with another embodiment of the invention, a method is provided for reporting calls having associated call transaction data, where the calls are communications between a subscriber and at least one second caller. The method includes accessing the call transaction data and identifying the subscriber associated with each call. An approximate longitude and latitude of the second caller is determined for each call using the call transaction data, and a call report including the approximate longitude and latitude for each call is delivered to the subscriber associated with the call.

In accordance with another embodiment, a method is provided for reporting call records of calls involving a call party. Each of these calls have associated call transaction data. The method includes accessing the call transaction data, identifying the call party associated with each call, and verifying the validity of the call transaction data. A statistical report related to the call transaction data is generated if the call transaction data is valid, and the statistical report is delivered to the call party via electronic mail (e-mail).

Yet another embodiment of the invention involves a method for reporting calls having associated call transaction data, where the calls are communications between at least first and second callers. The method includes accessing the call transaction data and identifying a caller associated with each call. The call transaction data is analyzed to determine an approximate geographical reference related to each call. A plurality of variable telecommunication transaction attributes associated with each call and correlated to the geographical reference for each call are electronically delivered to at least one caller.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIG. 3 is an example of a call record, which in one embodiment is provided by the telephone company for processing in accordance with the present invention;

FIG. 8 is a table exemplifying call detail data that may be produced according to the present invention;

FIG. 9 illustrates an exemplary geocoding logic hierarchy according to the present invention;

FIG. 12 provides an example of an e-mail report layout as received by a subscriber;

FIG. 16 illustrates a variable table used to store the variables that may be to build the resulting message;

FIG. 17 is a diagram identifying an exemplary list of variables that may be used in the message content;

FIG. 21 is a diagram illustrating an exemplary view of a calendar selection screen that may be generated according to the present invention;

FIG. 23 is a diagram illustrating a table exemplifying a report that may be generated by the report generator according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a system and method for reporting call transaction information. The system in receives call transaction data and processes it for each subscriber by generating information in a format that can be perceived by the subscriber in a convenient fashion. The information is delivered to the subscribers, and presented to the subscriber as a call transaction report. A variety of delivery methods may be used in connection with the present invention, such as an e-mail delivery.

The present invention is applicable to a wide variety of communications systems and methodologies. The present invention is particularly useful in connection with telephone call records associated with telephone companies, and therefore a significant portion of the ensuing description is described in terms of an implementation associated with telephone records and telephone companies. However, as will be readily apparent to those skilled in the art from a reading of the description provided herein, other types of communications records, systems, and entities are clearly within the scope of the invention, and the invention is thus not limited to the exemplary telephone record embodiment provided herein.

Figure 1:
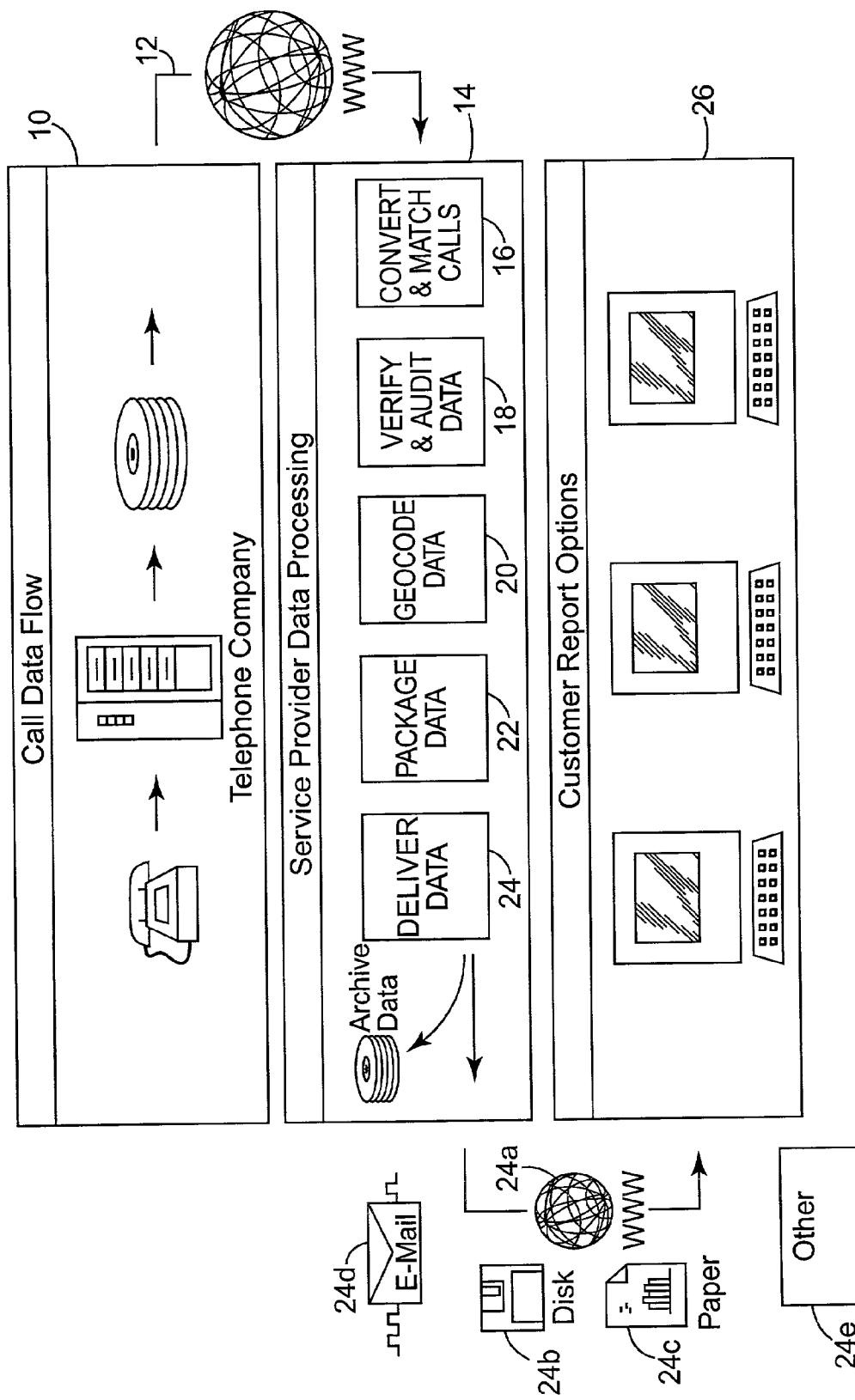
FIG. 1 is a high level block diagram of a system in which the principles of the present invention may be applied.

FIG. 1 provides an overview of an exemplary system implementing the principles of the present invention. FIG. 1 provides a block diagram of a system according to the invention, including a telecommunications company 10, service provider 14, and customer 26. In block 10, the telecommunications, such as a telephone company, captures and processes call transaction data for customers who subscribe to a reporting service employing the system of the present invention. The telecommunications company 10 transmits the call records as shown via path 12, via a global computer network (such as the Internet) or other appropriate data transmission mechanism, to the provider of the service embodied in the present invention. The telecommunications company 10 may represent any telecommunications entity having switching, routing, bridging or other technology in which the call data can be intercepted and processed in accordance with the invention. For example a telephone company switch or router, Internet node where Internet calls traverse the node; wireless communication base station, and the like. In one particularly useful embodiment of the invention, the telecommunications entity is a telephone company, such as a Regional Bell Operating Company (RBOC).

In block 14, the service provider processes the call records received from the telephone company 10. In order to do this, a number of functions are performed. The functions associated with one embodiment of the invention are illustrated by blocks in service provider call processing block 14, and can be performed by any suitable, computer-based systems. In block 16, the system converts the call record data into a format that is compatible with the system's geocoding software and report-generating software. Also in block 16, the call records are matched to the subscriber. In block 18, the system audits and verifies the validity of the data. In block 20, the system geocodes the call data. Thus, for each call, the system attaches a geographic longitude and latitude corresponding to the location of the second party to the call (the subscriber being the first party to the call). In block 22, the call records and the geocoded data are packaged into a call detail file. Block 24 represents the delivery of the call detail data, which can be delivered to the subscriber in a suitable way. For example, these delivery methods include delivery via the Internet 24a or other network transmission, and storage media 24b such as floppy disks, CD-ROM, tape or other storage media. Delivery may also be in paper form 24c via postal mail, fax, etc., and/or via wireless data transmission, electronic mail (e-mail) 24d, or other forms of electronic data delivery 24e. In one more recent embodiment, the delivery method may include, for example, a wireless application protocol (WAP) delivery that can be received via a WAP-compliant wireless device operated by the subscriber.

Block 26 illustrates that the call detail data is fed into a report generator that outputs a report in a format, which in one embodiment, is selected by the subscriber. The format may also be determined by the service provider or other authority, or may be predetermined. In one embodiment, the report generator is run by the subscriber on the subscriber's own receiving device such as a computer (unless the subscriber opts for paper delivery, in which case the service provider generates the report). It should be recognized that the receiving device includes any electronic device capable of receiving electronic data, such as computing devices, personal digital assistants (PDAs), data-capable wireless devices such as WAP devices, and the like. In the present example, the receiving device is a computing device operated by the subscriber. The available report formats include a variety of tables, graphs and maps. If the subscriber selects, for example, the map format, the report generator overlays the geocoded data on a map so that the subscriber can see on the map exactly where calls were placed to or received from along with various other information regarding those calls.

Figure 2:
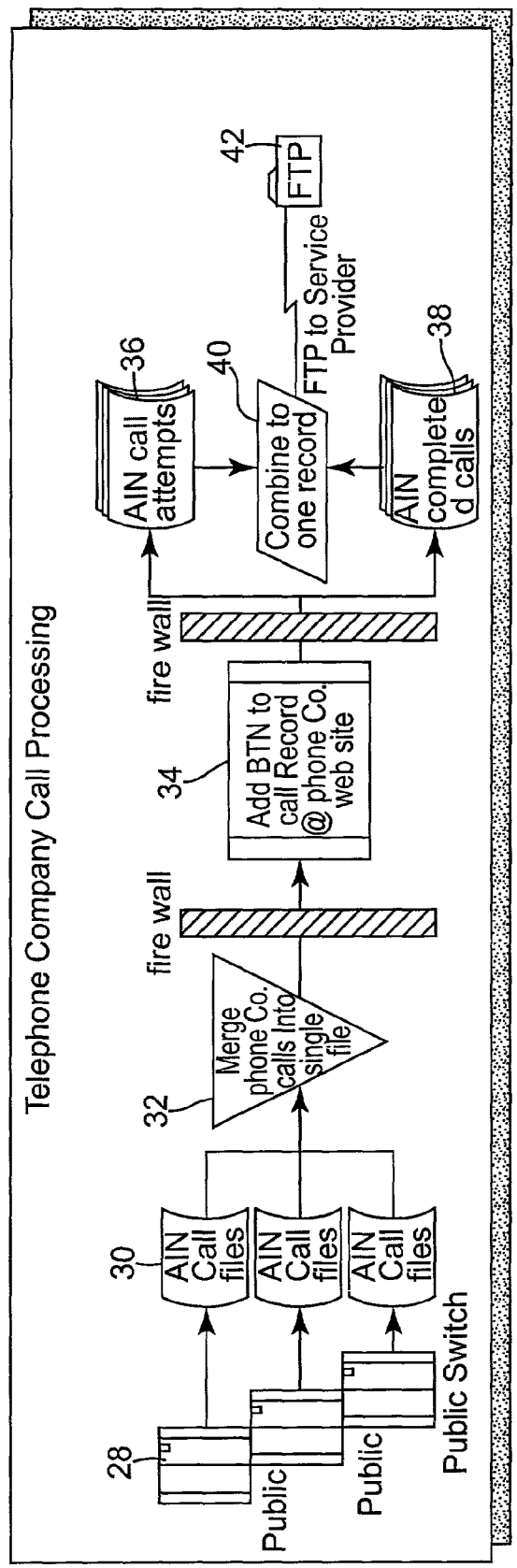
FIG. 2 is a block diagram illustrating one embodiment of telephone company call processing in accordance with the invention.

FIG. 2 provides an illustrative example of the call processing performed by a communications entity, such as a telephone company as shown in block 10 of FIG. 1. It should be noted that different telephone companies will process their call records in different ways. The present invention is capable of adjusting to the particular processing method employed by a given communications or telephone company. It should also be noted that different telephone companies will transmit their call records to the service provider at different points along the chain illustrated in FIG. 2.

In FIG. 2, at its various switches 28, the telephone company captures call transaction data off of the Advanced Intelligent Network (AIN) and places the data in AIN call files 30 of two types: call attempt files and completed call files. The call attempt files contain call transaction data for all attempted calls, while the completed call files contain call transaction data for all calls. Call transaction data can include the time, date and duration of the call, the originating call number, the terminating call number, and call status (busy, answered or unanswered). Because the present invention can be used with both outgoing and incoming calls, the subscriber's line number may be either the originating or the terminating call number. The telephone company then combines the AIN call files from its various switches into a single call attempt file and a single completed call file, as shown in block 32.

In block 34, the billing records, including billing telephone number (BTN) and zip code, of the second party to each call are added to the call transaction data files. Billing records may not be available for some calls (long distance calls, for instance). In this illustrative embodiment, the step embodied in block 34 is performed by the telephone company. However, the present invention is also capable of performing this step, as well as all subsequent steps.

Next, the AIN call attempt file 36 and the AIN completed call file 38 are combined to form one complete call record file, as shown in block 40. This call record file is then transmitted to the service provider by sending it to the service provider's FTP (File Transfer Protocol) server 42, or other appropriate means. In one illustrative embodiment, the telephone company will transmit the call record data to the service provider at least daily, but may be transmitted at any predetermined dates/times or any predetermined periodicity.

FIG. 3 is a printout of a sample single call record 44 that might be transmitted from the telephone company to the service provider. Some of the significant fields include the subscriber billing telephone number 46, the number of the subscriber's line 48 used for the call, the time 50 and date 52 of the call, the line number of the calling party 54, the zip code of the calling party 56, call type 58 and duration 60. Different telephone companies may transmit call records of varying formats. For instance, the call type field 58 of one telephone company might indicate whether the call was answered, unanswered or met with a busy signal, while for a different telephone company might indicate whether the call was incoming or outgoing. Also, the subscriber has the option of receiving records for incoming calls, outgoing calls or both, and the call record will vary accordingly.

Figure 4:
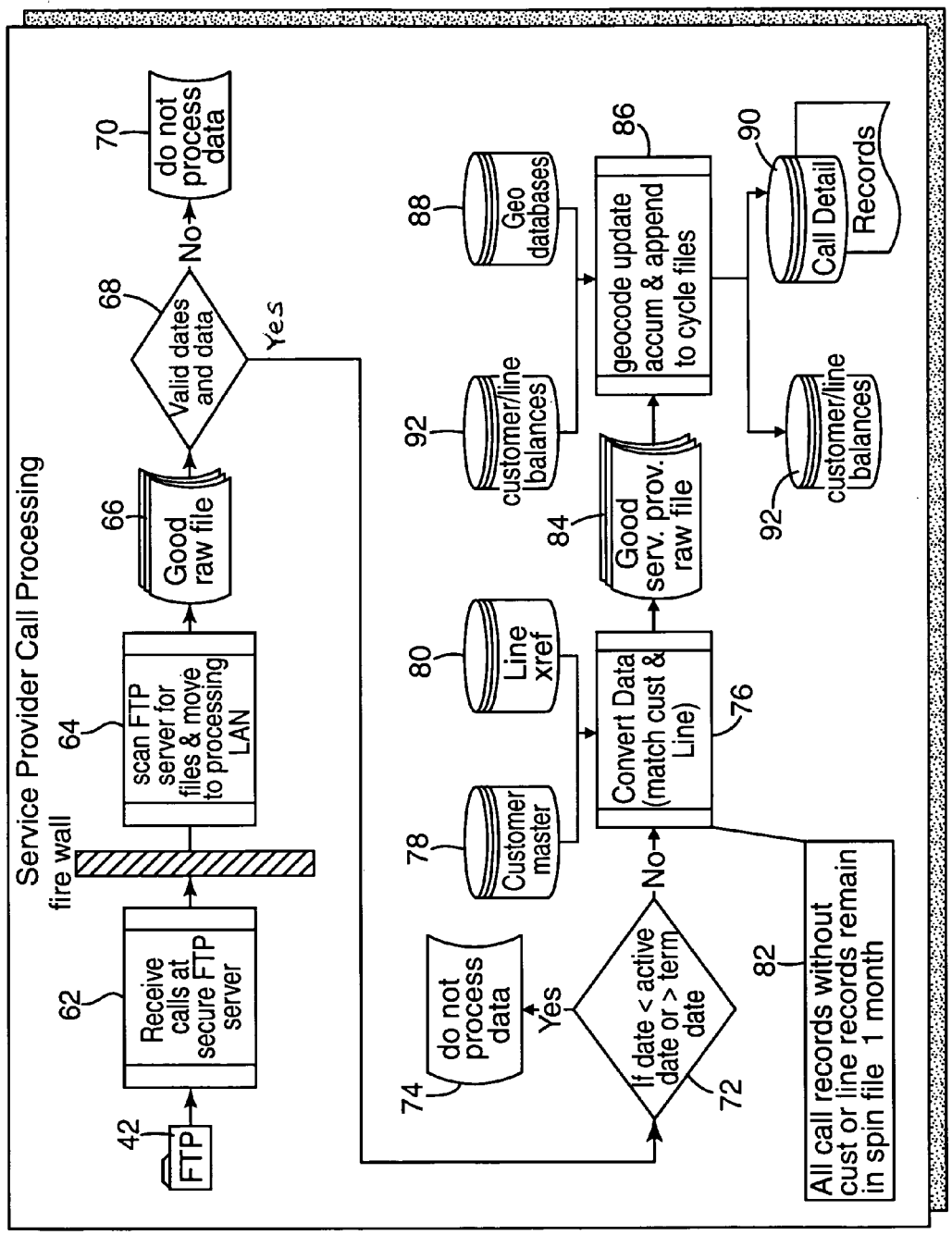
FIG. 4 is a block diagram illustrating one embodiment of call processing according to the present invention.

FIG. 4 provides a detailed breakdown of the call processing performed by the service provider as shown in block 14 of FIG. 1. The service provider receives the call record files from the telephone company by any appropriate means. In FIG. 4, the service provider receives the call record data at its secured FTP server 42, as shown in block 62. In block 64, the FTP server is scanned for files received. Also in block 64, when raw files 66 are received, they are transferred, in one illustrative embodiment, to a local area network processing server.

In block 68, the validity of the call record data 66 is checked. The system searches for anomalies in the data by performing statistical analysis to determine if certain variables fall within established parameters. Examples of variables that are analyzed include the number of calls received, the number of busy calls received and the number of calls for which the status is unknown in a given time period. The system may also check to ensure that calls were received during all hours of the day to determine whether data transmission problems were encountered during any time of the day, or to determine whether the system was temporarily down during any part of the day. The current data is compared to collected statistical data to determine if the current data is generally in line with the collected data. The parameters will vary from one subscriber to another. For example, for one subscriber it may be acceptable for five percent of its calls to be of unknown status, while for another subscriber, one percent may be the highest acceptable percentage of calls of unknown status. The system adjusts the parameters over time and for new situations as new statistical data is collected. The validity check is performed at the overall level, as well as the individual subscriber level. For example, at the overall level, the system compares the newly received files 66, in the aggregate against the statistical data maintained for aggregate files. Then, the same types of checks are performed on the individual customer basis. If the call record data is deemed invalid, it is kicked out of the system and not processed further, as shown in block 70. If the data is deemed valid, processing continues at block 72.

In block 72, the system verifies that the subscriber's account was active when the particular call was placed. If the account was terminated or not yet active, the data is not processed, as shown in block 74. In block 76, the call record data is converted into a format that is compatible with the service provider's geocoding software and report-generating software. Also in block 76, the call records are matched to the subscriber. In some cases, the telephone company will provide the customer number as part of the call record data. When that is the case, the system looks up the customer records in both a customer master file 78 and line cross-reference file (line xref) 80. The customer master file contains customer information (related to a given customer number) collected during an initial set-up procedure in which the customer's account is initialized. The cross-reference file 80 contains a cross-reference between particular telephone line numbers and customer numbers. If the customer number is not in the customer master file 78 and the line number is not in the line cross-reference file 80, the call record is placed in a spin file for a suitable period of time (such as one month) and processing is re-tried at that time, as shown in block 82.

If the telephone company does not provide the customer number, the system looks up the customer number in the line cross-reference file 80. If the line number is not in the line cross-reference file 80, again the call record is placed in the spin file for one month, as shown in block 82. Thus the output of block 72 is a good call record file in the service provider's format 84.

In block 86, the call record data is geocoded. The geocoding process attaches to each call the precise longitude and latitude of the geographic centroid, or geographic center, of either the zip (postal) code, area code or exchange code of the second party to the call. Five geographic databases 88 are maintained, one each for nine-digit zip codes, five-digit zip codes, three-digit zip codes, area codes, and exchange codes. Each database contains the precise longitude and latitude of the geographic centroid for each respective zip, area and exchange code. FIG. 9 illustrates an exemplary geocoding hierarchy.

In case-1 180, a nine-digit zip code exists in the call record's zip code field. If the same nine-digit zip code exists in the nine-digit zip code database, the longitude and latitude corresponding to that zip code are attached to that call. If the nine-digit zip code is not contained in the nine-digit database, the system looks in the five-digit zip code database for the first five digits of the nine-digit zip code. If that five digit zip code is present, the corresponding longitude and latitude are attached to the call. If the first five digits are not in the five-digit database, the three-digit database is searched for the first three digits of the nine-digit zip code. The three-digit database may be useful, for instance, for new zip codes which are not yet cataloged in the five-digit database. If the first three digits do not exist in the three-digit database, the system searches the exchange code database (designated npanxx DB in FIG. 9) for the first six digits (designated npanxx) of the line number of the second party to the call (i.e., the area code and exchange). The exchange code database contains data corresponding to particular exchange codes within particular area codes. An exchange code consists of the first three digits of a telephone number after the area code. Thus, if a match is found in the exchange code database, the longitude and latitude corresponding to the geographic centroid corresponding to the identified area code and exchange are attached to the call record. If no match is found in the exchange code database, the area code database (designated nap DB in FIG. 9) is searched for the area code (designated npa) of the line number. If that is unsuccessful, a special longitude/latitude value indicating unknown origin is attached to the call.

In case-3 184, a five-digit zip code is provided in the zip code field. If a five-digit zip code exists' in the call record's zip code field, a protocol similar to the above is used as shown in FIG. 9, beginning with a search of the five-digit zip DB and continuing on as described with respect to case-1 180.

As can be seen in case-2 182, case-4 186 and case-5 188 of FIG. 9, if less than five or between five and nine (i.e., six, seven or eight) digits exist in the call record's zip code field, the system presumes that the data is invalid and uses only the line number in geocoding that call as described with respect to case-1 180.

The system also assigns a value, shown in the far right-hand column of FIG. 9, to the longitude and latitude specification based on its precision. For example, when the nine-digit zip code database is used to determine the longitude and latitude, a more accurate approximation of the location of the second party to the call is obtained than if the five-digit or three-digit databases are used. The assigned value reflects this degree of accuracy. The assigned value can also be used to indicate the reliability of the data. For example, in case-2 182 and case-4 186, it is presumed that the zip code field in the call record contains bad data. There is then an increased probability that other data in the record, including the line number, is also unreliable. The assigned value reflects this reduced level of reliability.

The description now continues with respect to FIG. 4. In block 86, the customer accumulator and line accumulator are also updated. The accumulators tally the number of call records processed during the current cycle for each line and for each subscriber. Cycles may be any predetermined time period, such as daily, weekly, monthly, etc. The output of block 86 is the call detail data 90 which is the aggregate of the call record data 84 and the corresponding geocoded data. The call detail records 90 are accumulated until the end of the cycle, at which time they are prepared for distribution to the subscriber. The call detail records are also stored in the customer balance and line balance databases 92, which are used in the validity checks of block 68 and against which statistical analysis is performed.

Figure 5:
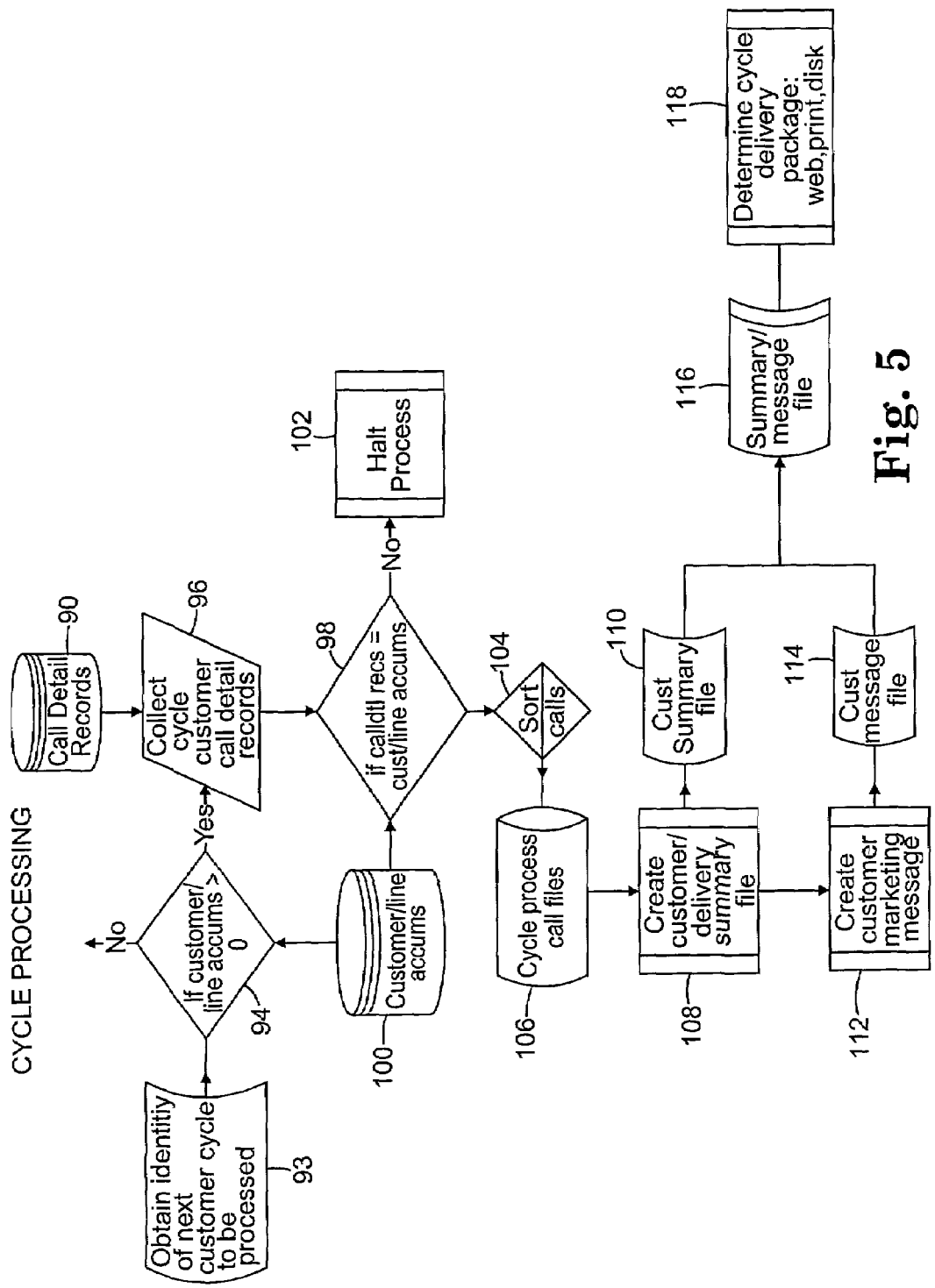
FIG. 5 is a block diagram illustrating one embodiment of end-of-cycle processing according to the present invention.

FIG. 5 illustrates the processing of the call detail records which takes place at the end of each cycle. The system first obtains the identity of a customer for which a cycle has ended and to which call detail records must be reported. This is indicated by block 93. In block 94, the system checks whether records have been processed for the given line or given subscriber (depending on whether calls are to be processed for all of the subscriber's lines or for just a given line) during the current cycle. If records have been processed, the call detail records 90 are collected as shown in block 96. In block 98, the system checks whether the number of call detail records 90 is equal to the value held in the accumulator 100. If it is not, there may be a problem with the call detail records 90 and the process is halted, as shown in block 102. If the accumulator 100 agrees with the call detail records, the calls are sorted as indicated by block 104 and cycle processing commences as indicated in block 106.

In block 108, a customer delivery summary file 110 is created. This file contains information regarding the subscriber's delivery preferences. This file is created using information obtained from the customer master file 78 and line cross-reference file 80. In block 112, a marketing message file 114 is created. The marketing message represented in the marketing message file may, for instance, be a logo, 'company name or other message and will later be placed on the output reports. This message is typically created by the telephone company. The customer delivery summary file 110 and customer message file 114 are then merged into a single summary/message file 116, which is used to determine whether the reports will be delivered to the subscriber in paper form, or via storage media such as floppy disk, the Internet, e-mail, wireless transmission, or other suitable mechanism as shown in block 118.

The report data can be delivered to the subscriber by any of a variety of methods. In one embodiment, the subscriber chooses the delivery method. Some representative delivery methods, as previously indicated, include delivery via the Internet, direct dial-up, e-mail, diskette, CD-ROM, wireless transmission, paper, etc. Of course, other transmission methods may be used as well.

Figure 6:
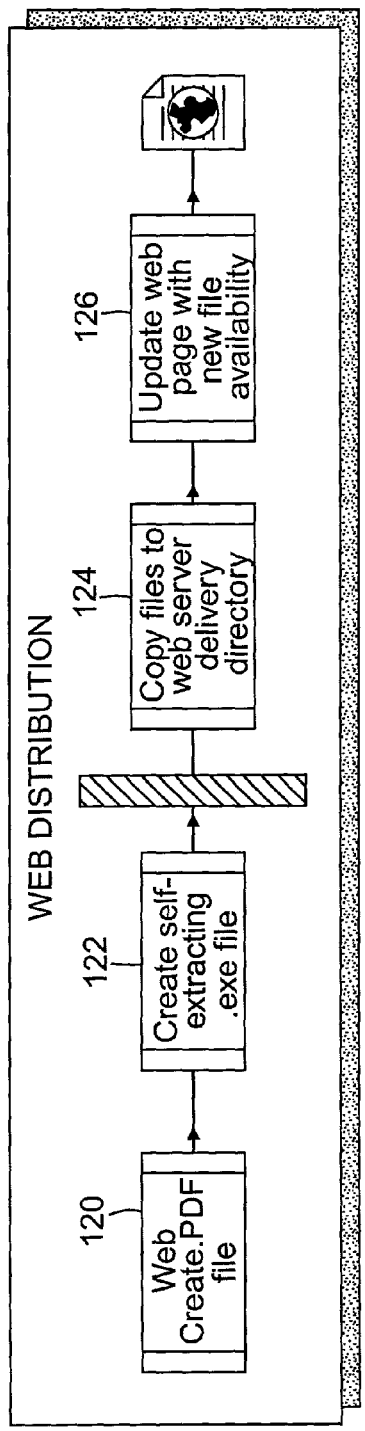
FIG. 6 is a block diagram illustrating one embodiment of web report distribution in accordance with the present invention.
Figure 7:
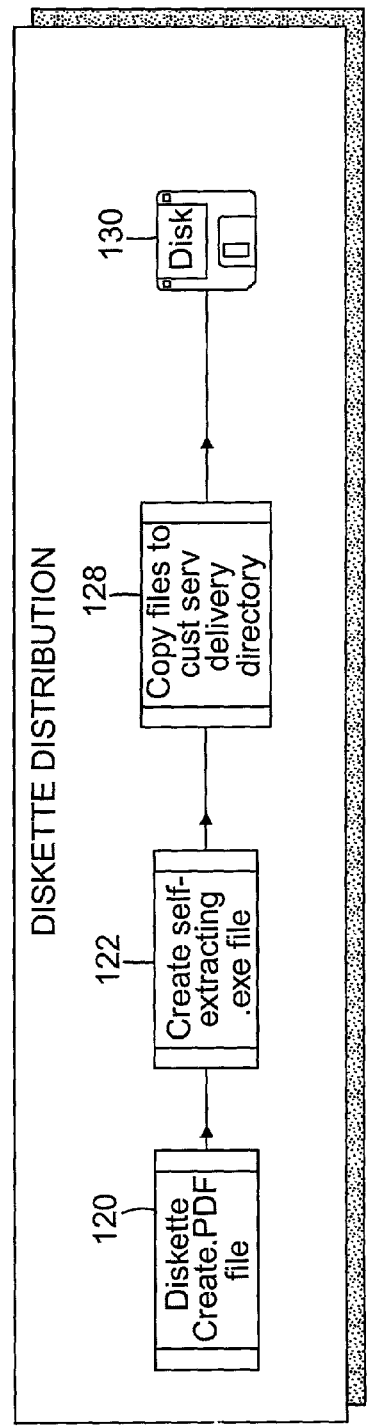
FIG. 7 is a block diagram illustrating one embodiment of storage media report distribution according to the present invention.

For purposes of illustration, embodiments of Internet and diskette distribution methods are shown in FIGS. 6 and 7 respectively. FIGS. 6 and 7 correspond to block 24 in FIG. 1. In accordance with the illustrated embodiments, a file is created in an electronic reporting format, such as a .PDF (paper document format) file, as shown at block 120. A self-extracting executable file (e.g., .EXE file) is created, as shown at block 122. In the case of web distribution, the files are copied to the service provider's Internet server delivery directory, as shown at block 124. At block 126, the service provider's web page is updated to avail the new files to the subscriber. The subscriber can retrieve the files at the service provider's web site. In the case of storage media (e.g., diskette) distribution, the .PDF and .EXE files are copied 128 to the customer service delivery directory, and then copied to the disk 130. The disk 130 or other such storage media can then be delivered to the subscriber.

A subscriber may opt to receive a hardcopy (i.e., paper) of the report, such as a person who is unable or otherwise unwilling to retrieve the information electronically. If the subscriber takes the paper delivery option, the service provider may creates an ASCII printstream file and a .EXE file. The service provider then generates the report according to the subscriber's instructions and delivers a paper copy to the subscriber.

In accordance with another embodiment related to the web distribution embodiment shown in FIG. 6, delivery of the report data may also be delivered to subscriber wireless devices, such as wireless application protocol (WAP) devices. Generally, WAP is a set of protocols that takes into account characteristics and functionality of Internet standards as well as standards for wireless services. It is an open standard, independent of wireless network standards. The motivations for WAP are primarily a result of physical and logical limitations of small wireless devices, such as limited keyboards and displays, limited bandwidth, limited memory and processing capabilities, and limited battery power. A markup language, referred to as the wireless markup language (WML), is used for authoring services designed to fit these smaller, and often portable, hand-held devices that have a considerably limited display area as compared to their desktop counterparts targeted by HTML. Another feature of WAP services is the availability of supporting more advanced functional tasks using WMLScript, which is at least loosely analogous to utilizing JavaScript in connection with HTML (HyperText Markup Language). The functional enhancements available through WMLScript include procedural logic and computational functions to WAP-based services.

A subscriber may therefore utilize a WAP-compliant wireless device to receive the report data via the wireless device. This can be performed periodically, or the subscriber may request the report data. Such a request may be transmitted via a wireless network to a WAP gateway using a Uniform Resource Locator (URL), generally using the Wireless Session Protocol (WSP), which is essentially a binary version of HTTP. The URL addresses the requested information on a network, such as a server coupled to the Internet. The server returns the requested content to the WAP gateway, and is ultimately perceivable at the subscriber's WAP terminal. In such an embodiment, a subscriber could obtain on-demand report data via a WAP-compliant device, such as a WAP cell phone or other portable, wireless device.

Subscribers who choose web or diskette delivery may also be provided with report-generating software, which is processed by the subscriber's computing device. The subscriber uses the report generating software to process the delivered data files, including the call detail data 90, and to generate reports relating to the call detail data. The subscriber may, if desired, view the raw call detail data 90, a sample of which is provided in FIG. 8.

The particular embodiment of call detail data illustrated in FIG. 8 includes the following fields: call date 132, call time 134, destination number 136, calling party number 138, call type 140 (incoming, outgoing), call disposition 142, call status 144, call duration 146 (in tenths of seconds), calling party name 148, postal (zip) code 150 of the calling party, longitude 152 and latitude 154 of the calling party, and the value 156 assigned to the longitude/latitude specification. The call disposition (disp) 142 and call status (stat) 144 fields work together to encode information about the call. For example, if call stat=1 and call disp=0, the call was answered. If call stat=0 and call disp=2, the line was busy.

If call stat=0 and call disp=3, the call was not answered. Other items can be encoded as well.

Figure 10:
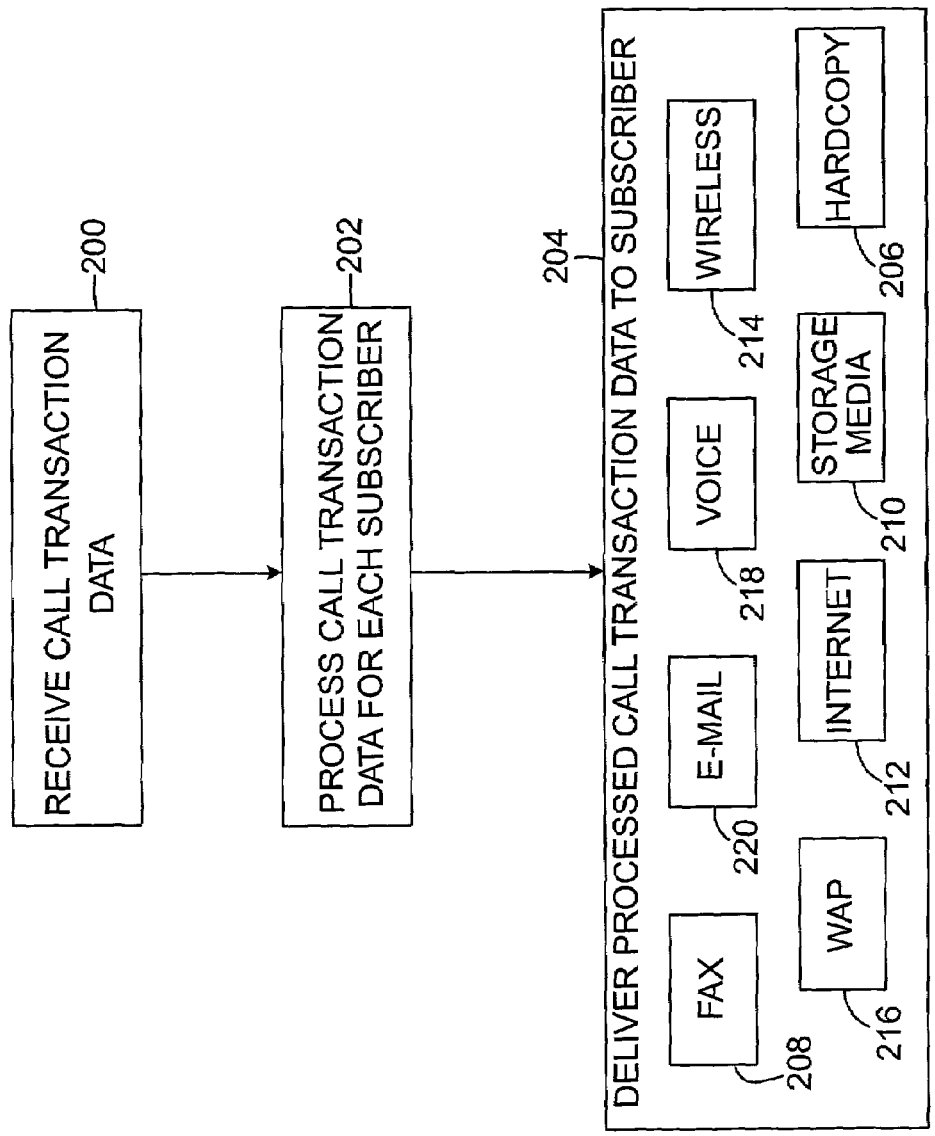
FIG. 10 is a flow diagram illustrating representative examples of delivery features associated with the call reporting methodology of the present invention.

FIG. 10 is a flow diagram illustrating representative examples of delivery features associated with the call reporting methodology of the present invention. Collected call transaction data is received 200, and the call transaction data is processed 202 for each subscriber as described above. Call transaction data may be collected at any appropriate communication hub, such as a switch, router, bridge, etc., and in one embodiment is collected at a telephone switch. As described above, call transaction processing 202 includes converting the call record data into a more desirable format, such as that which is compatible with the system's geocoding software and/or report-generating software. The processing also includes matching the received call transaction data to a particular subscriber. The call transaction data may be audited and the validity of the data determined as part of the processing. Data processing may also include geocoding the data, such as associating a geographic region corresponding to the location of the remote (i.e., non-subscriber) party of each call. Processing may also involve aggregating the call transaction records and geocoded data into a transportable file prior to delivery.

The call transaction data is delivered 204 to the subscriber. Various delivery manners may be employed, including delivering a hardcopy 206 of the data, faxing 208, or providing an electronic copy via storage media 210 such as magnetic and optical disks, tapes, CD-ROMs, etc. The information may be delivered via a network, such as the Internet 212, or may be delivered by wireless 214 methodologies and/or WAP 216. Audio delivery may also be utilized, such as through live or recorded voice 218.

Another particularly beneficial delivery method in accordance with the present invention is electronic mail (e-mail) delivery 220. For example, the data files may be delivered as an e-mail attachment, and processed by the subscriber's computing device using the report-generating software. In another particularly beneficial embodiment, the e-mail delivery according to the present invention provides a presentation of the call detail data as a report in the e-mail body itself. Other embodiments may instead, or may additionally, provide an electronic document attachment that the subscriber can access or "open" using application software available to the subscriber. The subscriber is therefore provided with various report viewing options in accordance with the e-mail delivery aspect of the invention. The e-mail delivery implementation is described in greater detail below.

Figure 11:
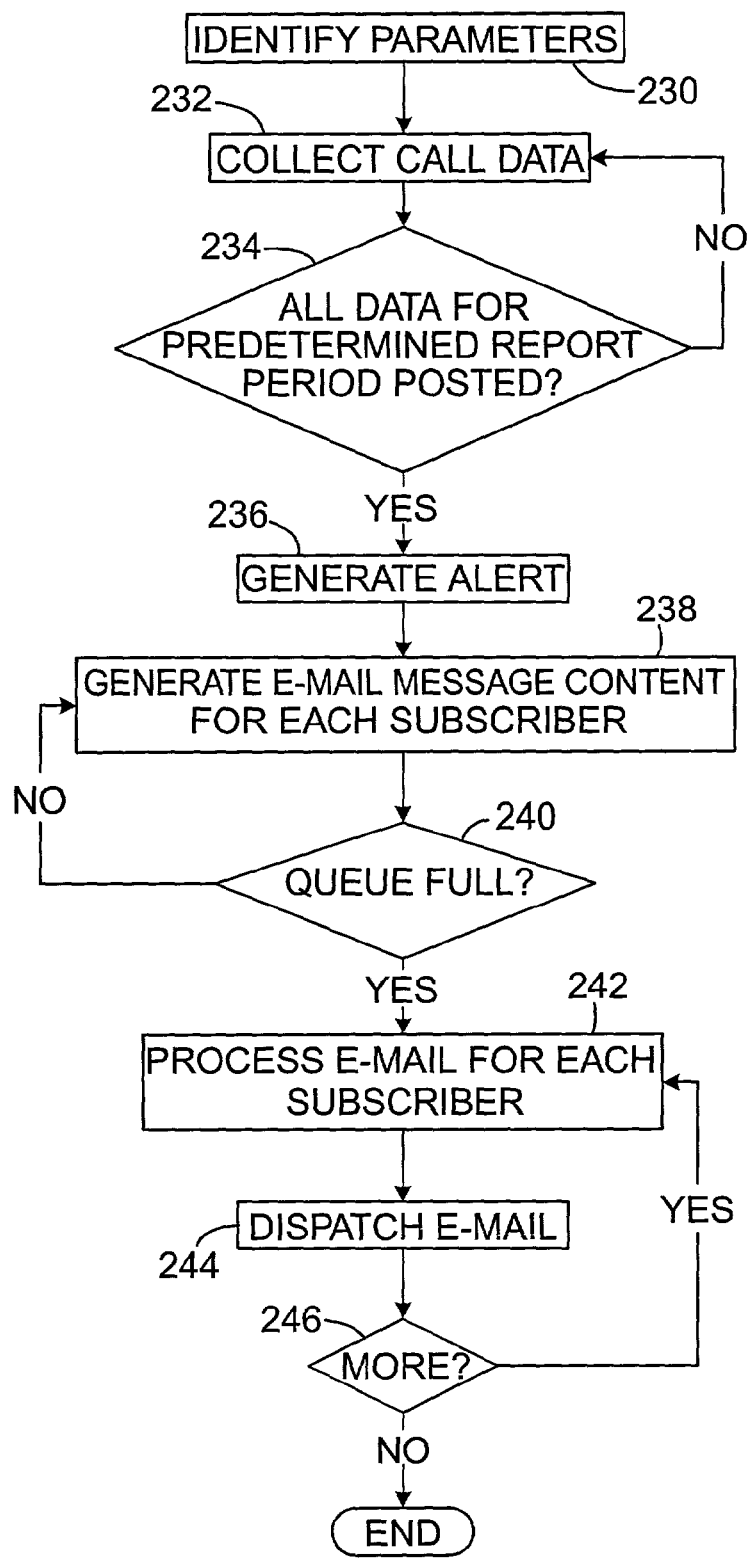
FIG. 11 is a flow diagram illustrating an embodiment of a call reporting methodology utilizing e-mail delivery in accordance with the invention.

FIG. 11 is a flow diagram illustrating one embodiment of a call reporting methodology utilizing e-mail delivery in accordance with the invention. Certain parameters may be identified in advance, as shown at block 230. These parameters may include the frequency or times that e-mail reports are to be dispatched to subscribers. For example, in one embodiment of the invention, e-mail reports are dispatched to subscribers at a predetermined frequency, such as each day, week, etc. Another embodiment contemplates fixed dates, such as preselected calendar dates. In another embodiment, other parameters may determine when the e-mail delivery is to be effected, such as reaching a predetermined number of call transactions for one, more, or the collective group of subscribers. In yet other embodiments, these parameters may be set by the subscribers, either dynamically or in advance. In this manner, subscribers may decide to change the periodicity of when e-mail reports are received, or may make real-time requests for immediate call report delivery. As can be seen, a wide variety of parameters may be identified to configure e-mail delivery options and to perform any number of predetermined functions.

The call data is collected 232, as previously described. Depending on the report period, it is determined 234 whether the call data for that report period has been posted (i.e., is available). The predetermined report period may be configured as part of the parameters identified at block 230, or may be fixed by the service provider. Whether all data for the report period has been posted may be determined by, for example, monitoring the state of a flag, monitoring for the expiration of a time duration, etc.

When the criteria has been met, which in one particular embodiment is the passage of one calendar week, an alert will be generated 236. This alert triggers the generation 238 of the message content that will accompany the e-mails sent to subscribers. The message content may be generated in one or more formats. For example, in one embodiment, the message content for e-mails is read from a content table, and is provided in both text and HyperText Markup Language (HTML) formats. As each message is generated, it may be immediately presented for processing, or alternatively, as depicted in FIG. 11, a predetermined number of e-mails may be generated before being presented for processing. Determining whether this queue is full, as determined at decision block 240, determines when the e-mails will be processed. For example, one embodiment of the invention utilizes an e-mail generation queue that upon reaching twenty queued messages, the queue is released for processing.

The messages are then processed 242 for each subscriber. Processing the e-mails includes locating each subscriber's e-mail address and creating an e-mail message to that user's e-mail address. The e-mails are then dispatched 244 to the user. If more e-mails are available for processing as determined at decision block 246, processing returns to block 242. The e-mail generation and processing functions are described in greater detail below.

In accordance with the present invention, a variety of e-mail formats may be used. The format may be text, HTML, or other format. The main e-mail message may be provided in a first format, such as HTML, and additional alternative formats may be provided at e-mail attachments. One beneficial aspect of e-mail delivery is the ability to provide the call report in a useful format for the subscriber in the body of the e-mail, so that the subscriber's e-mail software presents the report to the subscriber without having to open additional software to view the report.

FIG. 12 provides an example of an e-mail report layout 250 as received by a subscriber. The e-mail report includes an e-mail address of the entity sending the e-mail, where the e-mail domain 252 identifies the entities domain that may be available for return e-mail. In one embodiment, the e-mail domain 252 may be a telephone company who sponsors the call reporting service, or may be an address corresponding to a hosting service. The e-mail recipient 254 is the e-mail address of the service subscriber.

This example e-mail format includes various information fields for the subscriber. The report period field 256 identifies the period for which the call report covers. In one embodiment, the report period is preset to one week, such that the subscriber receives a call report e-mail each week for the period identified in the report period field 256. The report customer number field 258 identifies the telephone number in which the report pertains, e.g., the subscriber's telephone number. Report data field 260 includes the call transaction data as presented to the subscriber. This field 260 may be significantly larger than that shown in FIG. 12, and may in fact include additional fields or pages available through e-mail scrolling or selection of hyperlinks. The example of FIG. 12 is a simplistic example provided for purposes of illustration.

The report data field 260 includes the call data that is the subject of the service to the subscriber. For example, the call data in field 260 may include a text listing of total incoming calls for the reporting period, as well as the total answered, unanswered, busy, and other calls for the reporting period. Calculated statistical information may also be provided, such as the seven-day average number of calls per day, and the average calls per business day. The busiest calling day and busiest calling hour can be provided, as well as the numbers and percentages of calls per day. The number of calls, whether answered, unanswered, busy, etc., can be provided on a time segmented basis such as hourly. Numbers of calls based on the location of the other party to the call (i.e., the party on the call with the subscriber) can also be presented. A wide variety of relevant statistical information may be provided via this e-mail delivery approach. Although the report data field 260 illustrated in FIG. 12 is represented in text format, this and other information may be presented in graphical format, such as many types of graphs, charts, maps, etc.

Marketing fields may also be provided, including upgrade field(s) 262 and advertisement field(s) 264. The upgrade field 262 allows the telephone company and/or hosting service to present subscribers with a means to upgrade their service directly from the e-mail. For example, a Internet address and/or hyperlink 266 may be provided to allow subscribers to select the hyperlink and automatically be presented with an upgrade site on the Internet. Alternatively, a telephone number, e-mail address, or other contact information may be provided in connection with upgrade field 262 to allow subscribers to upgrade, cancel, or otherwise change their service. The advertisement fields 264 allow the telephone company, the hosting service, or advertisers to present advertisements to the subscribers.

A direct cancellation field 268 may be provided to allow the subscriber to cancel the e-mail report or the service altogether. Other utility fields 270 may also be provided. In the illustrated embodiment, utility field 270 allows a subscriber to identify additional individuals (such as co-workers) to receive the call report e-mail.

Figure 13:
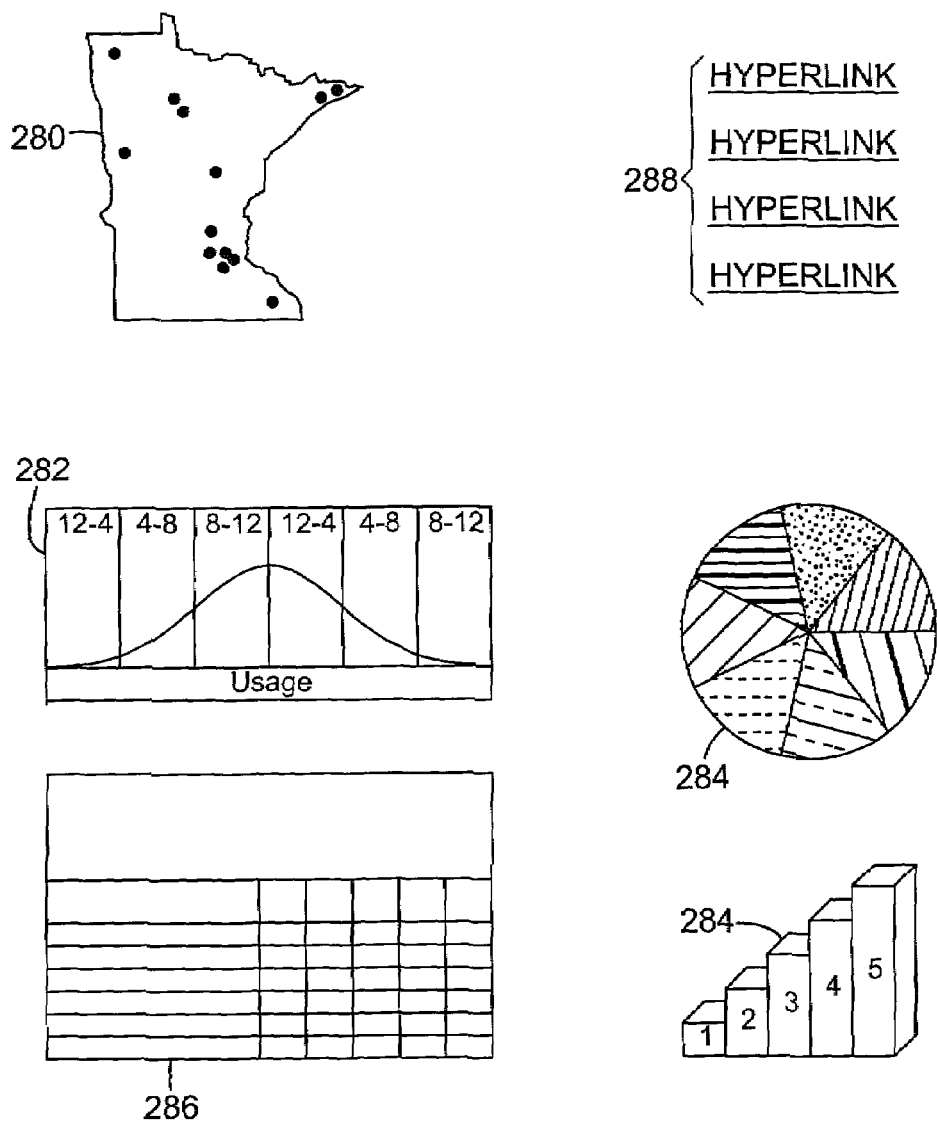
FIG. 13 illustrates various graphical representations of the call report data, including maps, graphs, charts, and structured data such as spreadsheets.

It should be recognized that the e-mail format presented in FIG. 12 is for illustrative purposes only. A variety of different formats may be utilized in accordance with the present invention. For example, FIG. 13 illustrates various graphical representations of the call report data, including maps 280, graphs 282, charts 284, structured data such as spreadsheets 286, etc. Further, links 288 may be provided to jump to different areas of the e-mail, to web sites, or other destinations capable of being accessed via links.

Figure 14:
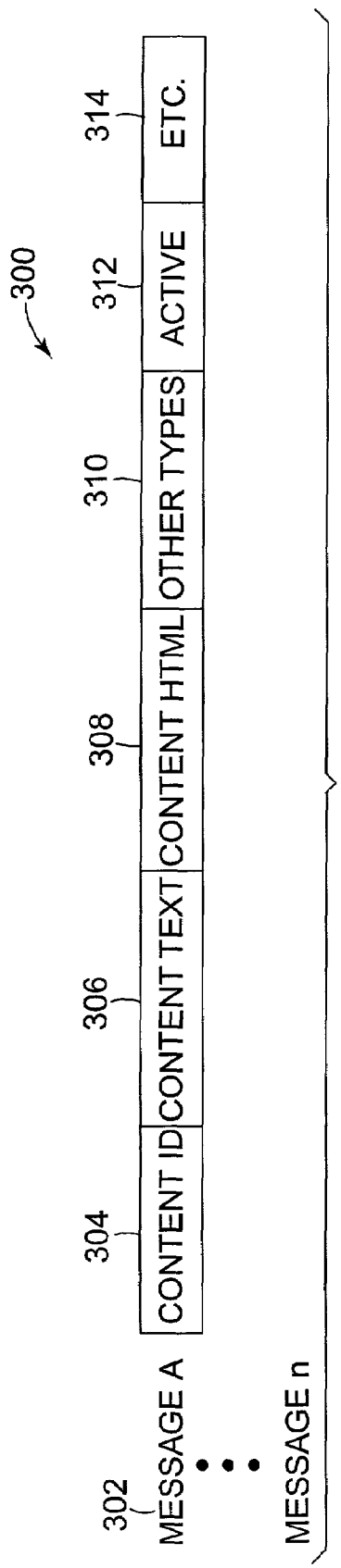
FIG. 14 illustrates a message content table used to store the content of the message that will be sent to the subscriber.

In order to generate e-mail reports, the message content is stored in a database(s). In one embodiment, database tables are used to store the appropriate data. A message content table 300 is shown in FIG. 14, which is used to store the content of the message that will be sent to the subscriber. In the illustrated embodiment, there is one row for each type of message, and each row will contain the various message formats. For message type-A 302, a unique identifier is stored in the content ID field 304. The various message formats in the illustrated embodiment of FIG. 14 include at least a text format and an HTML format, where the content text field 306 includes the layout and format of the report using text, and the content HTML field 308 includes the layout and format of the report using HTML. Field 310 represents that other message formats may also be stored as part of the content table 300. The state of the active field 312 identifies whether the content for this message is currently active and should be used for e-mail generation. Field 314 represents that other message content may also be stored as part of the content table 300.

Figure 15:
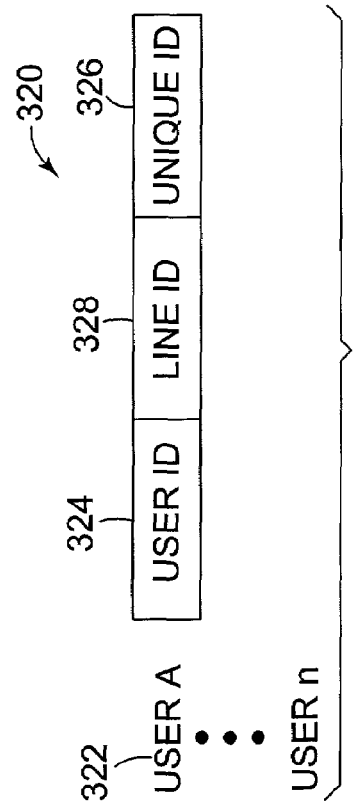
FIG. 15 illustrates a user table used to store all active subscribers of the call reporting service.

The database tables may also include a user table 320 as shown in FIG. 15. This table is used to store all active subscribers of the call reporting service. In the illustrated embodiment, there is one row for each user (i.e., subscriber). For user-A 322, a user identification field 324 stores an identification of the subscriber, and the unique identification field 326 stores a unique identification for the subscriber used for security reasons. The line identification field 328 identifies the telephone line to use for report generation.

Also included as a database table is the variable table 340 shown in FIG. 16. This table stores the variables that can be used in the resulting message (where the message layout and format are stored in the content table 300 shown in FIG. 14). There is one row for each variable, and the number of variables may be selected as desired. Each of the variables have the database format shown in the variable table 340. Using variable-A 342 as an example, the associated database row includes a variable identification field 344 that stores a unique identifier for identifying each variable name. The variable name field 346 stores the name of the variable. In one embodiment, the variable object field 348 stores the name of the Java object invoked for the variable name, and returns the value for the variable name placeholder. Where the variable object returns multiple values, the variable row field 350 stores the row that the variable name's value can be found. Where the variable object returns multiple values, the variable column field 352 stores the column that the variable name's value can be found. Field 354 represents that other variable columns may also be stored as part of the variable table 340.

As described in connection with the variable table 340, a variety of variables can be used in the resulting message. FIG. 17 identifies an exemplary list of variables that may be used in the message content, whether HTML or text-based content. The "incoming" variable 360 identifies the number of calls that came in. The "answered," "unanswered," "busy," and "other" variables 362, 364, 366, 368 respectively identify the number of calls that were answered, unanswered, busy, or were of an unknown state. The "incoming %" variable 370 identifies the percentage of calls that came in (e.g., 100%). The "answered %," "unanswered %," "busy %," and "other %" variables 372, 374, 376, 378 respectively identify the percentages of calls that were answered, unanswered, busy or in an unknown state. The "seven day average" variable 380 represents the average number of calls for a seven day period, while the "five day average" variable 382 represents the average number of calls for a five day period such as Monday through Friday. The "five day total" variable 384 represents the total number of calls for the five day period. The "busy day" variable 386 identifies the day with the most total calls, and the "busy day total" variable 388 represents the number of calls that occurred for the busiest day. The "top zip" variable 390 identifies the zip code where the most calls came from during the reporting period, while the "top state" variable 392 identifies the state associated with the most calls.

It should be recognized that the variables may be made such that they represent incoming calls, outgoing calls, both incoming and outgoing calls, or some predefined combination thereof. Thus, while the illustrative embodiment described in connection with FIG. 17 includes variables directed to incoming calls, additional and/or different variables may be used to report outgoing calls from the subscriber's customer number (i.e., phone number) during the reporting period.

Figure 18:
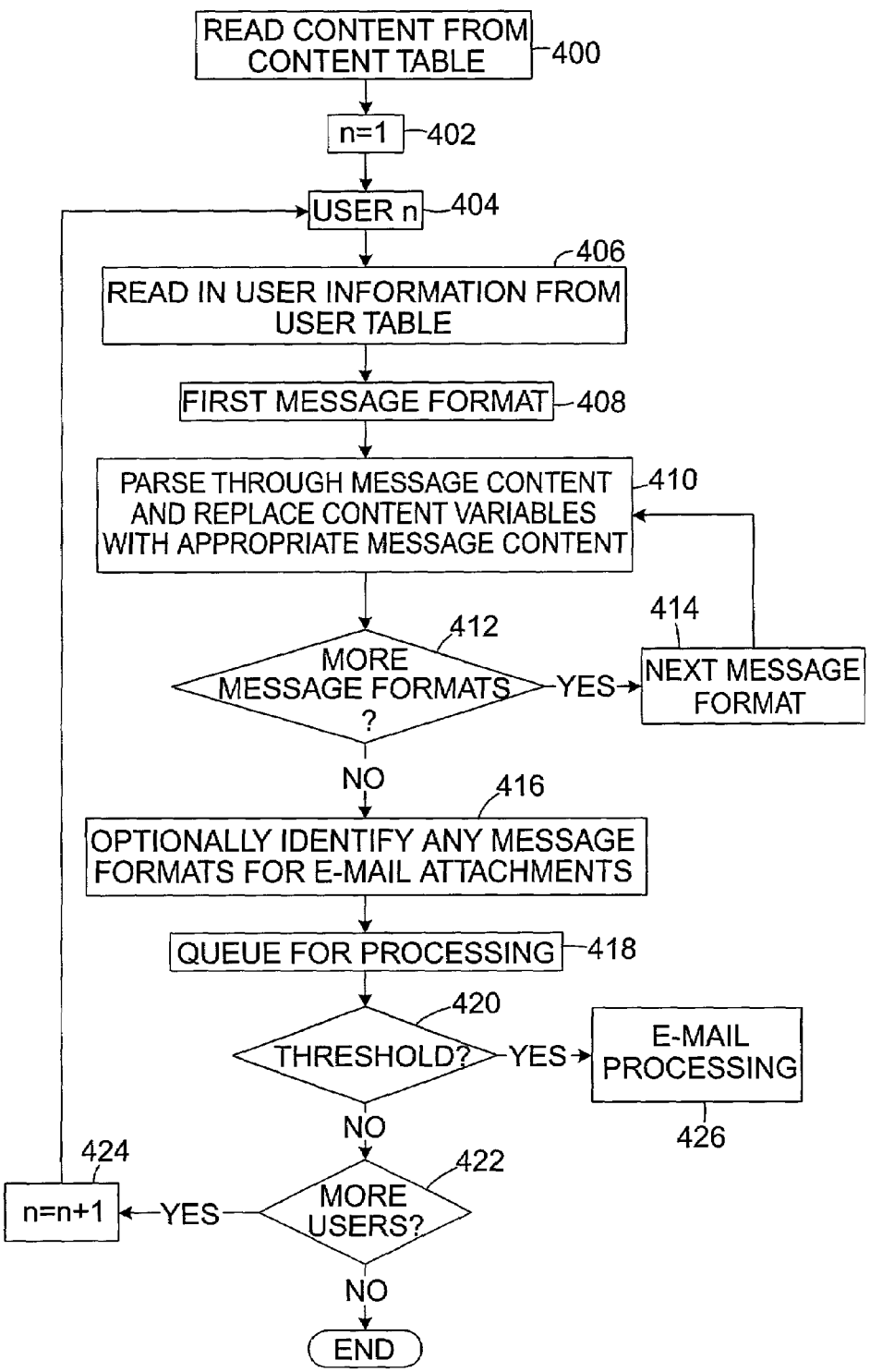
FIG. 18 is a flow diagram illustrating an embodiment of an e-mail generation methodology in accordance with the invention.

As was described in connection with FIG. 11, the e-mail delivery methodology used in connection with call reporting includes e-mail generation (e.g., FIG. 11, block 238) and e-mail processing (e.g., FIG. 11, block 242). FIG. 18 is a flow diagram illustrating an embodiment of an e-mail generation methodology in accordance with the invention. The tables described above, as well as other data tables, store data that is used to generate the e-mails in accordance with the invention.

To generate call report e-mails, the message content is read 400 from the content table. In one embodiment, the content associated with each of the different message formats is read in. For example, referring briefly to FIG. 14, a text format may be stored in field 306, an HTML format may be stored in field 308, and any one or more formats may be stored in field(s) 310. These different message contents are thus retrieved as shown in block 400.

For purposes of illustration, a variable "n" is used in the flow diagram of FIG. 14 to represent activity that occurs for each user (i.e., subscriber). It should be recognized that the inclusion of the variable "n" is for purposes of gaining an understanding of the illustrated embodiment, and does not necessarily represent a particular programming step. In the illustrated embodiment, this variable "n" is initially set to a value of one at block 402, and "user-n" shown at block 404 is therefore user-1 when n=1.

For this first user, the appropriate user information such as the user identification and telephone number is read 406 from a user table, such as the user table 320 shown in FIG. 15. The content table shown in FIG. 14 may include multiple message format, and the first message format is identified as shown at block 408. For example, the first message format may be the HTML message format. As shown at block 410, parsing through the message content is then carried out for the first message format, and the content variables are replaced with the appropriate message content. For example, the HTML message will be parsed through and each content variable being replaced with the appropriate value for that subscriber.

When this replacement is complete, it is determined 412 whether there are more message formats. For example, in the content table embodiment of FIG. 14, HTML and text formats are supported as evidenced by fields 306, 308 respectively, as well as other potential formats represented by field(s) 310. Where more message formats exist, the next message format is identified as shown at block 414, and the message content associated with that message format is parsed and replaced as shown at block 410.

When there are no further message formats, one or more of these message formats may optionally be identified as an e-mail attachment as shown at block 416. For example, the HTML message may be designated as the main email, and the text message and any other messages may be designated to be attachments to the e-mail. It should be recognized that such designation may be done at any time, and the serial depiction of the flow chart of FIG. 18 is not to be limiting. For example, it may be determined in advance that HTML messages will be presented in the body of the ensuing e-mail, and the text messages will be presented as attachments.

The messages associated with the user are then queued 418 for processing. For example, where the example includes an HTML message and a text message for a user, then both the HTML and text messages are queued for processing. In one embodiment these messages may be immediately sent to the email processing stage. However, in the illustrated embodiment, messages are queued 418, and when it is determined 420 that the queue has reached a predetermined threshold (e.g., twenty users, forty messages, etc.), then the messages are released to the e-mail processing stage 426. When the threshold has not been reached as determined at decision block 422, (e.g., the predetermined threshold has not been reached), the process is applied to the next user. This is depicted by adding one to the flowchart variable "n" as shown at block 424, and returning to block 404 where the next user may be considered in generating the appropriate e-mail content.

Figure 19:
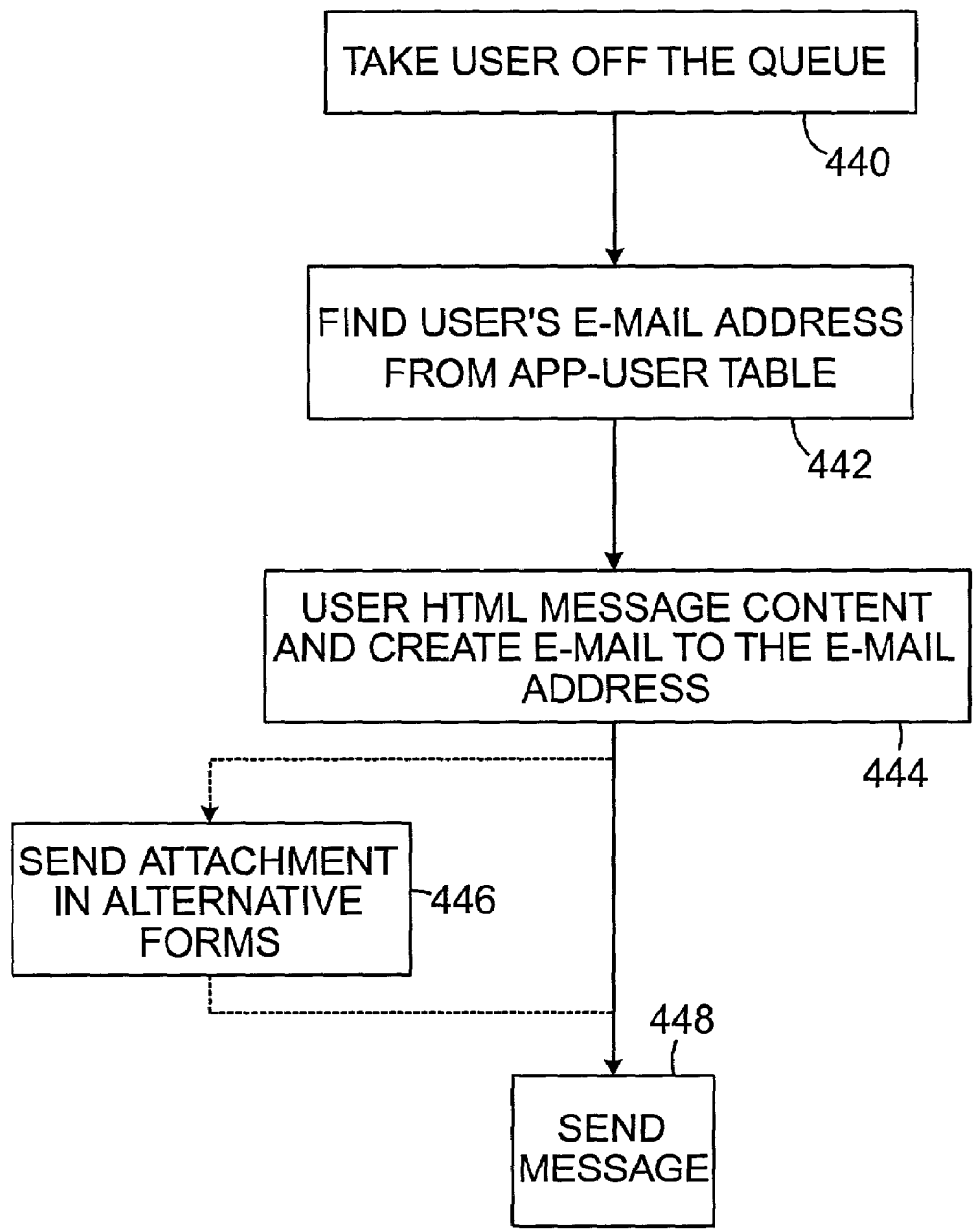
FIG. 19 is a flow diagram illustrating one embodiment of an e-mail processing methodology in accordance with the present invention.

FIG. 19 is a flow diagram illustrating one embodiment of an e-mail processing methodology in accordance with the present invention. The first user (subscriber) is taken off the queue 440 for processing. The user's e-mail address is located in an application user (App-User) table that includes e-mail addresses of the subscribers, as shown at block 442. The address may be found using the user ID stored with the information in the queue. An e-mail message is then formulated to this user's e-mail address using the first message content, which in one embodiment results in an HTML e-mail message as shown at block 444. If desired, additional e-mail messages may be attached in alternate formats as shown at block 446, such as attaching to the e-mail a text version of the call report. When the subscriber email address, message, and attachments have been properly included, the e-mail message is dispatched to the target user as illustrated at block 448.

Exemplary call reports were previously described in connection with the e-mail delivery option of the present invention. Such reports are presented to the subscriber using, for example, a program operating on a computer that can read such e-mails. For instance, any program operating on a computer that is capable of receiving and viewing HTML and/or text messages can be used in accordance with the present invention. As future e-mail formats are developed, the report generator available to the subscriber need only be configured to receive and view such e-mail format, and the call report may be viewed by the subscriber. Attachments to the email may be sent in an unlimited number of software formats to allow the subscriber flexibility in the manner of viewing the report. For example, an attachment of the call report may be provided as a PDF file, in which case the user needs the appropriate application software program to process and view the file.

In the context of e-mail report generators, and in the context of other report generators that receive reports via the Internet, storage media, etc., the report generator can receive the transmitted report for viewing. The report generator function was described in connection with FIG. 1, and more particular examples are provided below.

Figure 20:
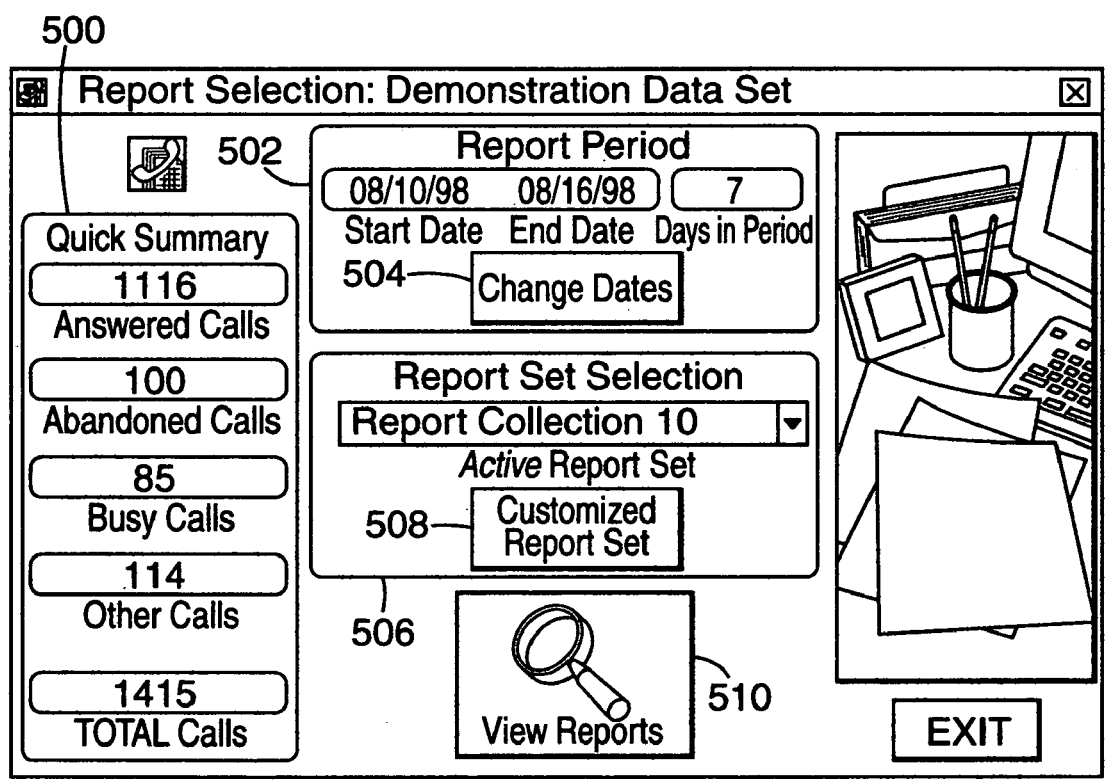
FIG. 20 is a diagram illustrating an exemplary view of a main report screen that may be generated by a report generator in accordance with the present invention.

The report generator is capable of producing multitudes of different reports in various formats, including tables, graphs and maps. FIG. 20 illustrates a main screen that a user of the report generator software may first encounter. A quick summary 500 provides a brief synopsis of the call detail data. In report period box 502, the user can select the dates for which a given report or set of reports should be generated. Selecting (e.g., clicking on) the "Change Dates" button 504 with a mouse pulls up a calendar, an illustrative example of which is provided in FIG. 21. The user clicks on the dates on the calendar 520 to select the report period. The user is not limited to viewing data from the most recent time period. Rather, data from previous time periods may also be included in the reports.

In the report set selection box 506 the user selects which reports are to be generated. The user can choose among predefined sets of reports, determined by the service provider. These predefined report sets lump together various reports that may be useful for a specific purpose such as marketing or staffing, for example.

Figure 22:
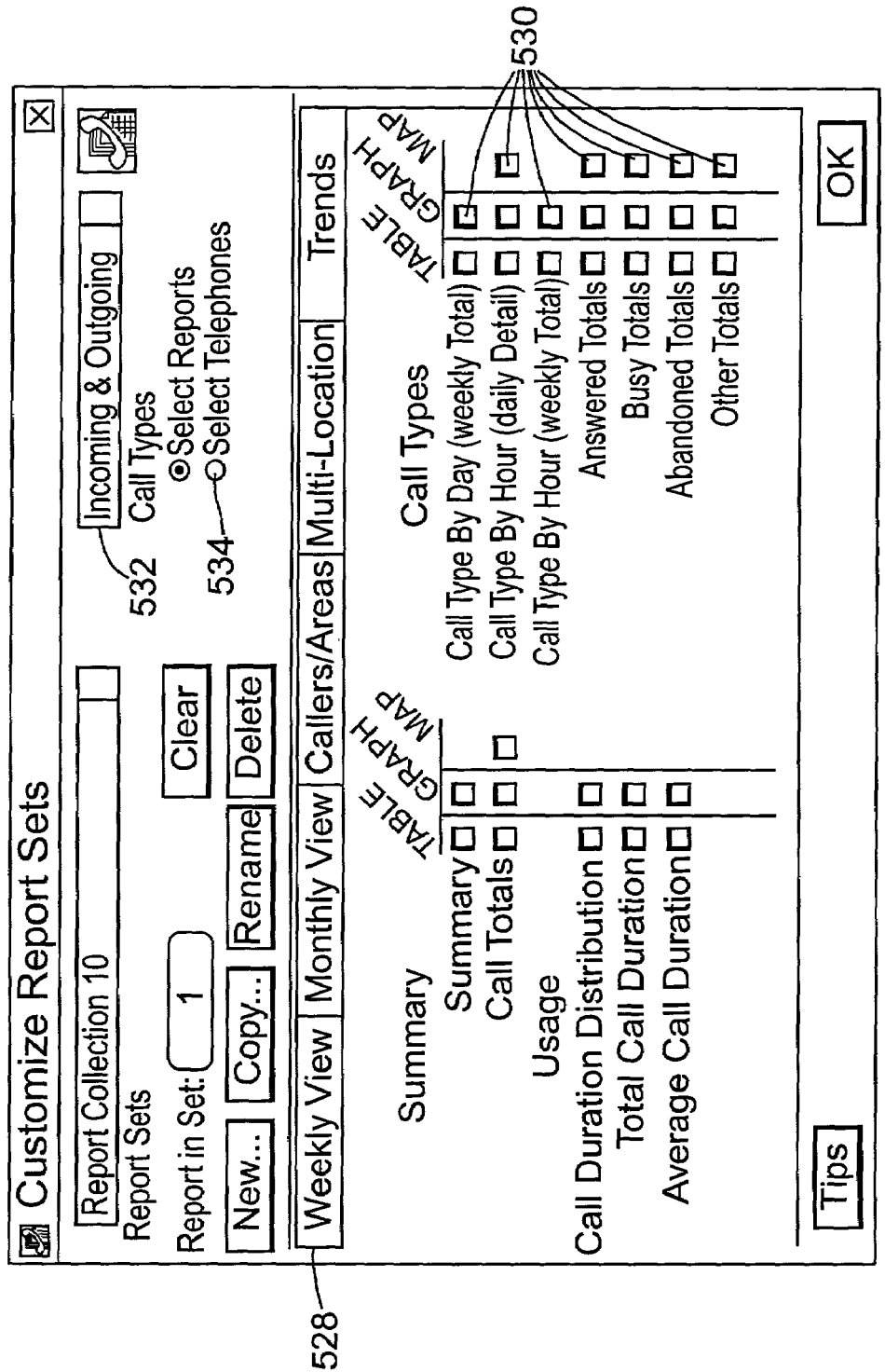
FIG. 22 is a diagram illustrating an exemplary view of a user interface screen in which the report format and/or report parameters may be selected or modified according to the present invention.

By clicking on the "customize report set" button 508, the user can also customize a report set so that each time the software is run, a predefined set of reports, selected by the user, will be generated. Clicking on the "customize report set" button 508 accesses a menu screen 528 such as the one illustrated in FIG. 22. The menu in FIG. 22 lists a variety of tables, graphs and maps. Other menus listing various other tables, graphs and maps can be accessed by clicking on various buttons above the menu. To select which reports should be generated, the user selects (e.g., clicks on) the boxes 530 corresponding to the desired reports. In box 532, the user can select whether to have reports generated for incoming calls, outgoing calls, or both. At radio button 534, the user can select to have reports generated for all of its lines, for a particular line, or for a selected group of lines.

Referring again to FIG. 20, to view the selected reports, the user clicks on the "view reports" button 510. FIG. 23 provides an example of a table 540 generated by the system upon selection of the "view reports" button 510. The table lists all of the zip codes from which calls were received in the given time period for the first time, and ranks them in terms of number of calls. Such information may be useful in developing and analyzing marketing and advertising strategies. The data in this table could also be presented in graph form, as could the data from any generated table.

Figure 24:
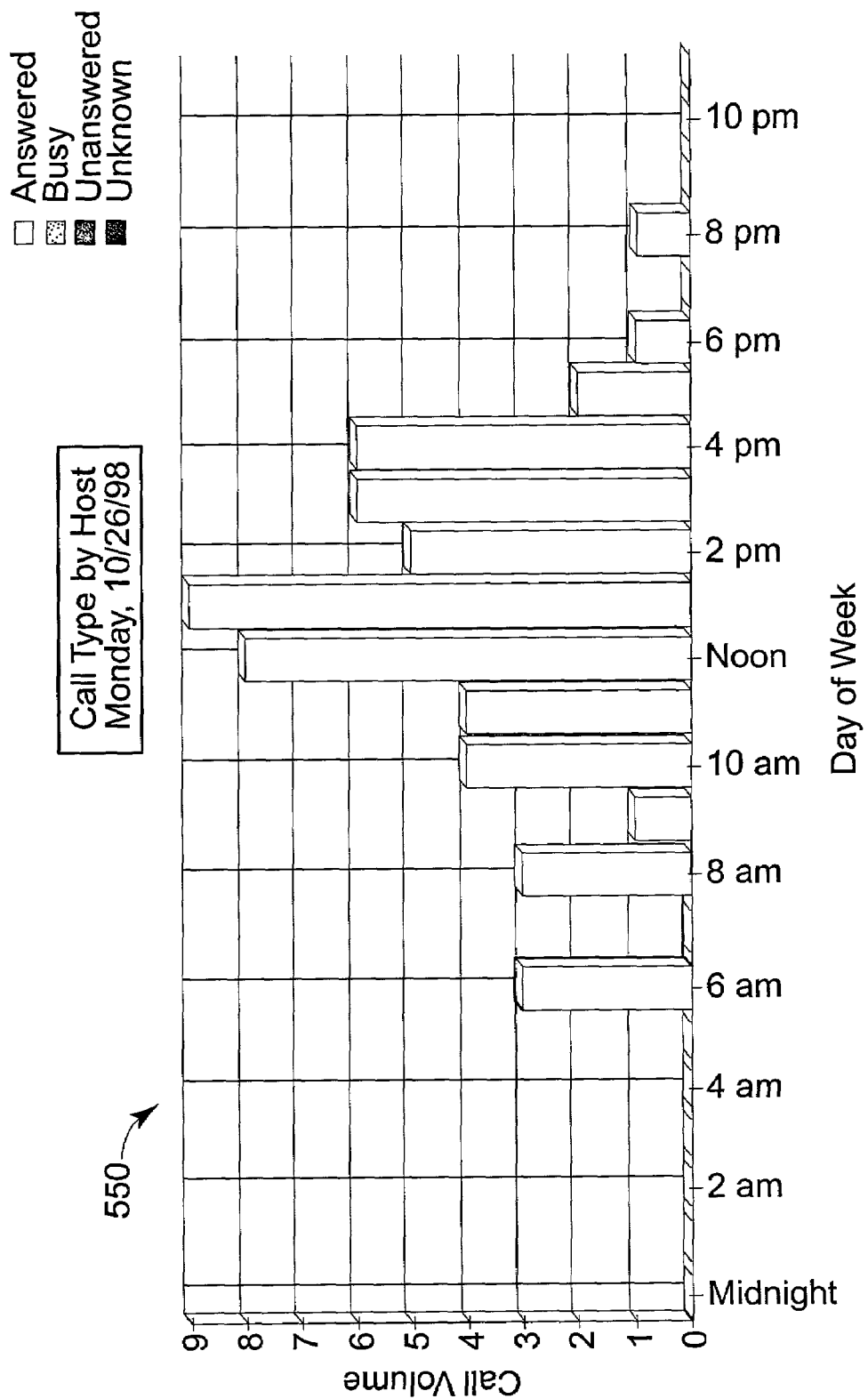
FIG. 24 is a diagram illustrating a graph exemplifying a report that may be generated by the report generator according to the present invention.

FIG. 24 provides an example of a graph 550 generated by the system. The graph shows the quantity of the various call types (answered, busy, unanswered, unknown) received during each hour for the given day. Such information may be useful in making staffing decisions. Of course, the system can also be configured to suggest answers to such decisions. For example, the system can be programmed with any desired staffing or business parameters (such as a number of calls which can be serviced by an individual, and a maximum desired number of unanswered calls). With that information, the system can analyze the collected information and make recommendations, such as "Add an operator from 10:00 am to 1:00 pm on Thursdays" or "You average 20 unanswered calls between 6:00 am and 8:00 am. Modify store hours to accommodate incoming calls as early as 6:00 am." Any other desired parameters and recommendations can be implemented as well.

Some of the other tables and graphs that may be generated by the system include various information regarding, for example, top callers, top zip codes, new callers, call duration, unanswered calls and busy signals. Of course, all of this data can be reported for either incoming calls, outgoing calls, or both.

Figure 25:
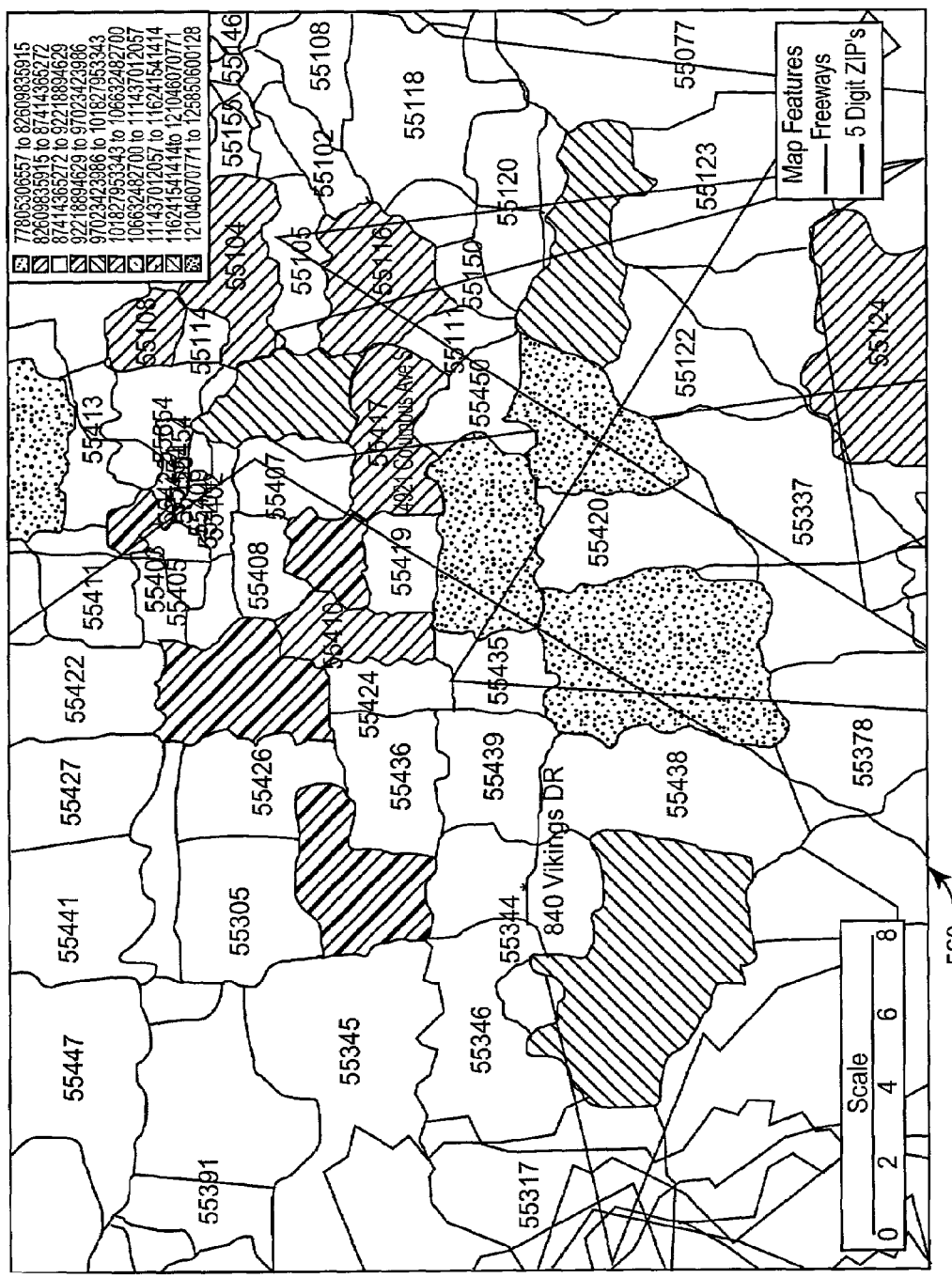
FIG. 25 is a diagram illustrating a map exemplifying a report that may be generated by the report generator according to the present invention.

Many reports can also be generated in map form. FIG. 25 provides an example of a map 560 generated by the system. The map indicates the zip codes from which the most calls were received by color-coding each zip code according to the quantity of calls.

Figure 26:
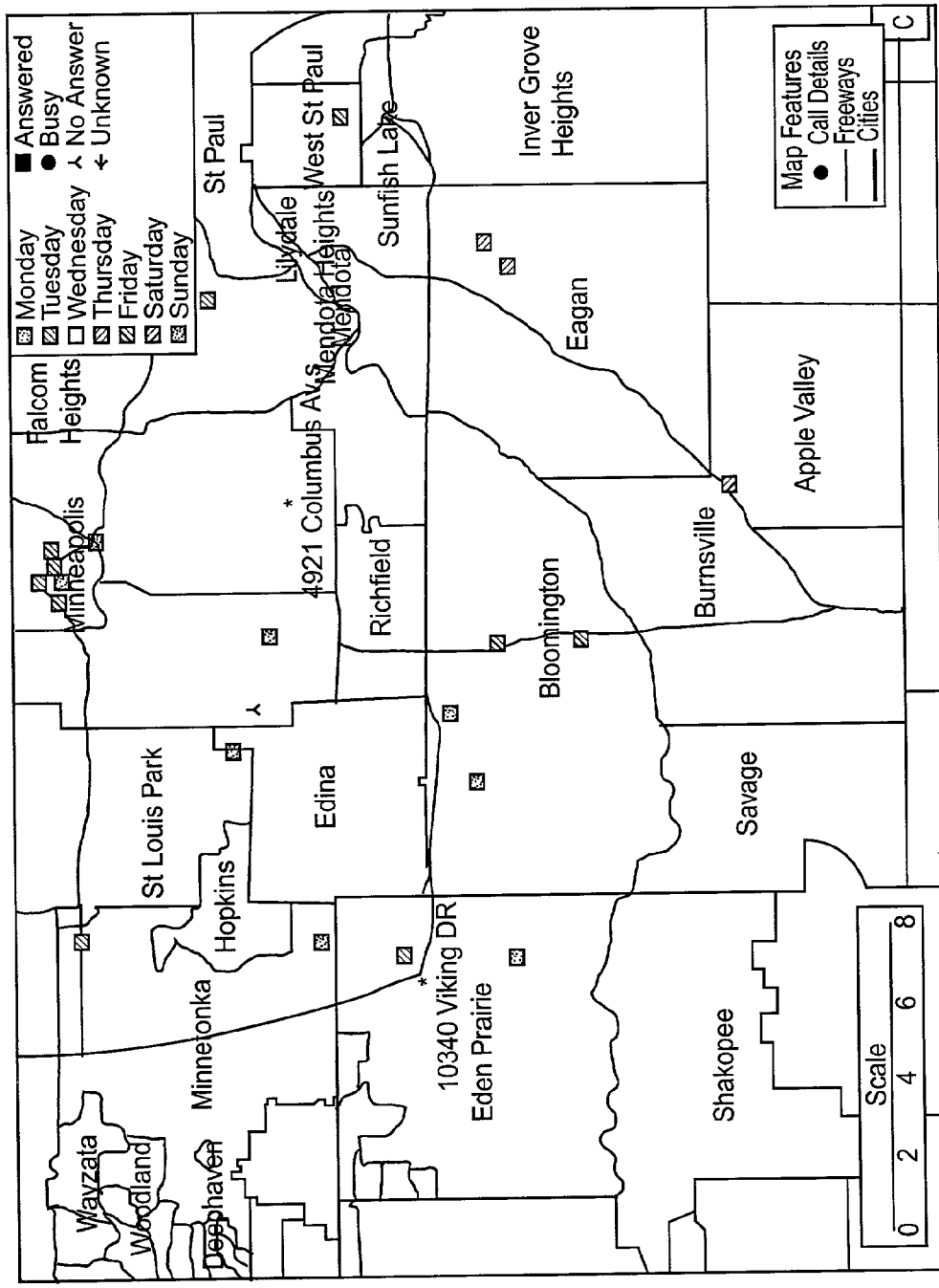
FIG. 26 is a diagram illustrating a more specific map of a report that may be generated by the report generator according to the present invention.

The software can place each call or caller on a map at its precise geocoded longitude and latitude. FIG. 26 provides an example of a map 570 that utilizes geocoded information. The map shows all incoming calls for the stated time period and indicates which day they were placed using color-coding. A square is placed for each call at the exact longitude and latitude determined by the geocoding process of block 86 in FIG. 4. Using geocoded data, the system can also map the location of, for example, top callers, new callers, unanswered calls and calls that received a busy signal.

The foregoing description of the exemplary embodiment of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with the particular representative embodiments set forth in this detailed description, but rather by the claims appended hereto.

What is claimed is:

1. A method for reporting communication records to at least one subscriber, the communication records of each subscriber including call transaction data corresponding to call transaction activity of the subscriber, the method comprising:

receiving a request for call transaction data from a subscriber;

receiving the call transaction data;

verifying the validity of the call transaction data in part by performing a statistical analysis to determine whether certain variables within the call transaction data fall within parameters that are determined based on previously collected statistical call transaction data;

matching the call transaction data associated with the subscriber;

formatting the call transaction data;

enabling the subscriber to select an electronic delivery mechanism for the formatted call transaction data; and electronically transmitting the formatted call transaction data to the subscriber using the subscriber selected electronic delivery mechanism.

2. The method as in claim 1, wherein electronically transmitting the formatted call transaction data to the subscriber via e-mail comprises transmitting the e-mail in a text format.

3. The method as in claim 1, wherein electronically transmitting the formatted call transaction data to the subscriber via e-mail comprises transmitting the e-mail in an HTML format.

4. The method as in claim 1, wherein electronically transmitting the formatted call transaction data to the subscriber via e-mail comprises transmitting the formatted call transaction data via the e-mail in a plurality of formats.

5. The method as in claim 1, wherein the formatted call transaction data comprises one or more of text, tables, graphs and maps.

6. The method as in claim 1, further comprising configuring formatting options by the subscriber.

7. The method as in claim 1, wherein the formatted call transaction data comprises at least a summary report portion and at least one detailed report portion.

8. The method as in claim 1, wherein the e-mail includes a selectable option to change subscriber service.

9. The method as in claim 8, wherein the change of subscriber service comprises at least one of an upgrade to a different subscriber service, a downgrade to a different subscriber service, and canceling the subscriber service.

10. The method as in claim 1, wherein the e-mail includes advertisements.

11. The method as in claim 1, wherein formatting the call transaction data comprises parsing through message content and replacing content variables with message content from call transaction data.

12. A method for reporting communication records to at least one subscriber, the communication records of each subscriber including call transaction data corresponding to call transaction activity of the subscriber, the method comprising:

receiving the call transaction data;

verifying the validity of the call transaction data by performing statistical analysis to determine whether certain variables fall within parameters established using previously collected statistical call transaction data;

matching the call transaction data associated with the subscriber;

formatting the call transaction data; and electronically transmitting the formatted call transaction data to the subscriber using a subscriber selected electronic delivery mechanism.

13. The method as in claim 12, wherein receiving the call transaction data comprises receiving an electronic representation of the call transaction data from a call switching system.

14. The method as in claim 12, wherein matching the call transaction data associated with the subscriber comprises comparing a subscriber list to a subscriber identification associated with the call transaction data.

15. The method as in claim 12, wherein formatting the call transaction data comprises arranging the data into a file capable of electronic transmission.

16. The method as in claim 12, wherein electronically transmitting the formatted call transaction data comprises delivering the formatted call transaction data via a wireless application protocol (WAP).

17. The method as in claim 12, wherein electronically transmitting the formatted call transaction data comprises delivering the formatted call transaction data via one or more of a network download, a wireless protocol, an FTP transfer, an audio signal, and an Internet phone.

18. The method as in claim 12, wherein electronically transmitting the formatted call transaction data comprises delivering the formatted call transaction data via e-mail.

19. The method as in claim 18, wherein delivering the formatted call transaction data via e-mail comprises delivering the e-mail periodically.

20. The method as in claim 18, wherein delivering the formatted call transaction data via e-mail comprises delivering the e-mail upon request by the subscriber.

21. The method as in claim 18, wherein delivering the formatted call transaction data via e-mail comprises delivering the e-mail upon occurrence of a predetermined event.

22. The method as in claim 18, further comprising associating a geographic location to parties of each call engaged with the subscriber through analyzation of one or more location parameters included in the call transaction data, wherein the accuracy of the geographic location is a function of the location parameters.

23. The method as in claim 12, wherein the certain variables further comprise at least one of a number of calls received, a number of busy calls received, or a number of calls for which a status is unknown in a given time period.

24. The method as in claim 18, further comprising geocoding the call transaction data, wherein geocoding the call transaction data comprises associating a geographic region corresponding to the location of a non-subscriber party of each call.

25. The method as in claim 18, further comprising geocoding the call transaction data, wherein geocoding the call transaction data comprises associating a longitude and latitude corresponding to the location of a non-subscriber party of each call.

26. The method as in claim 18, wherein formatting the call transaction data comprises aggregating the call transaction records and geocoded data into a transportable file.

27. The method as in claim 18, further comprising presenting the formatted call transaction data as a report to the subscriber, wherein the report comprises at least one of a table, a map, and a graph.

28. The method as in claim 18, further comprising collecting the call transaction data corresponding to each subscriber by recognizing each of the subscriber's call transactions that traverses a communications hub.

29. The method as in claim 28, wherein the communications hub comprises at least one of a telephone switch, router or bridge.

30. A call reporting apparatus for reporting communication records to at least one subscriber, the communication records of each subscriber including call transaction data corresponding to call transaction activity of the subscriber, the call reporting apparatus comprising:

means for receiving the call transaction data;

means for verifying the validity of the call transaction data in part by using a statistical analysis based on historical statistical call transaction data;

means for matching the call transaction data associated with the subscriber;

means for formatting the call transaction data; and means for electronically transmitting the formatted call transaction data to the subscriber using a subscriber selected electronic delivery mechanism.

31. A computer-readable medium having computer-executable instructions for facilitating the reporting of call records to at least one subscriber, the call records including call transaction data corresponding to call transaction activity of the subscriber, the computer-executable instructions performing steps comprising:

receiving the call transaction data;

verifying the validity of the call transaction data by performing statistical analysis to determine whether certain variables fall within parameters established using previously collected statistical call transaction data;

matching the call transaction data associated with the subscriber;

formatting the call transaction data; and electronically transmitting the formatted call transaction data to the subscriber using a subscriber selected electronic delivery mechanism.

32. A method for reporting calls having associated call transaction data, the calls being between a subscriber and at least one second caller, the method comprising:

accessing the call transaction data;

identifying the subscriber associated with each call;

determining an approximate longitude and latitude of the second caller for each call using the call transaction data based in part on a closest correlation of stored location parameters and by further assigning a value to the determined longitude and latitude that indicates a degree of accuracy of the determined longitude and latitude; and delivering a call report including the approximate longitude and latitude for each call to the subscriber associated with the call using a subscriber selected electronic delivery mechanism.

33. The method as in claim 32, wherein delivering the call report comprises delivering a hardcopy report.

34. The method as in claim 32, wherein delivering the call report comprises delivering at least one storage media storing an electronically-perceivable representation of the call transaction data.

35. The method as in claim 32, wherein delivering the call report comprises delivering the call report via electronic mail (e-mail).

36. The method as in claim 35, wherein delivering the call report via e-mail comprises delivering the call report via e-mail for all calls occurring over a predetermined time period to the subscriber.

37. The method as in claim 35, wherein the call transaction data includes at least one of calls placed by the second caller to the subscriber, and calls placed by the subscriber to the second callers.

38. The method as in claim 35, wherein the call transaction data for a given call includes a postal code of the call originator for the given call and wherein determining an approximate longitude and latitude comprises using the postal code to obtain the approximate longitude and latitude of the call originator.

39. The method as in claim 38, wherein the determining step comprises correlating the postal code with the longitude and latitude of a geographic centroid of an area defined by the postal code.

40. The method as in claim 35, wherein the call transaction data includes an area code of a telephone line number of the call originator and wherein the determining step comprises using the area code of the telephone line number of the call originator to obtain the approximate longitude and latitude.

41. The method as in claim 40, wherein the determining step comprises correlating the area code with the longitude and latitude of a geographic centroid of an area defined by the area code.

42. The method as in claim 35, wherein the call transaction data comprises an area code and exchange code of a telephone line number of the call originator and wherein the determining step comprises using the area code and exchange code of the telephone line number of the call originator to obtain the appropriate longitude and latitude.

43. The method as in claim 42, wherein the determining step comprises correlating the area code and exchange code with the longitude and latitude of a geographic centroid of an area defined by the area code and exchange code.

44. A method for reporting call records of calls involving a call party, wherein each of the calls has associated call transaction data, the method comprising:
    accessing the call transaction data;
    identifying the call party associated with each call;
    verifying the validity of the call transaction data by performing statistical analysis to determine whether certain variables fall within parameters established using previously collected statistical call transaction data;
    generating a statistical report related to the call transaction data if the call transaction data is valid; and
    delivering the statistical report to the call party using the subscriber selected electronic delivery mechanism.

45. The method as in claim 44, wherein the certain variables further comprise at least one of a number of calls received, a number of busy calls received, or a number of calls for which a status is unknown in a given time period.

46. A method for reporting calls having associated call transaction data, the calls being between at least first and second callers, the method comprising:
    accessing the call transaction data;
    identifying a caller associated with each call;
    analyzing the call transaction data to determine an approximate longitude and latitude related to each call based on a closest correlation of stored location parameters and a call originator location parameter and further assigning a value to the determined longitude and latitude that indicates a degree of accuracy of the determined longitude and latitude; and
    electronically delivering to at least one caller a plurality of variable telecommunication transaction attributes associated with each call and correlated to the approximate longitude and latitude for each call, wherein the plurality of variable telecommunication transaction attributes are delivered employing an electronically delivered mechanism selected by the at least one caller.

* * * * *